(12) United States Patent
Choi et al.

(10) Patent No.: US 12,422,245 B2
(45) Date of Patent: *Sep. 23, 2025

(54) SEMICONDUCTOR MEASUREMENT APPARATUS

(71) Applicant: Samsung Electronics Co., Ltd., Suwon-si (KR)

(72) Inventors: Garam Choi, Suwon-si (KR); Wookrae Kim, Suwon-si (KR); Jinseob Kim, Suwon-si (KR); Jinyong Kim, Suwon-si (KR); Sungho Jang, Suwon-si (KR); Younguk Jin, Suwon-si (KR); Daehoon Han, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 228 days.

This patent is subject to a terminal disclaimer.

(21) Appl. No.: 18/317,395

(22) Filed: May 15, 2023

(65) Prior Publication Data

US 2024/0133673 A1 Apr. 25, 2024
US 2024/0230314 A9 Jul. 11, 2024

(30) Foreign Application Priority Data

Oct. 25, 2022 (KR) .................. 10-2022-0138580

(51) Int. Cl.
*G01B 9/02* (2022.01)
*G01B 9/02056* (2022.01)
*G01B 9/02097* (2022.01)

(52) U.S. Cl.
CPC ..... *G01B 9/02044* (2013.01); *G01B 9/02058* (2013.01); *G01B 9/02097* (2013.01); *G01B 2210/56* (2013.01); *G01B 2290/70* (2013.01)

(58) Field of Classification Search
CPC ............ G01B 9/02097; G01B 2210/56; G01B 2290/70; G01B 11/02; G01B 9/02058; G01N 21/21; G01N 21/9501
See application file for complete search history.

(56) References Cited

U.S. PATENT DOCUMENTS

2007/0242263 A1* 10/2007 Huang ............... G01B 11/0641
356/128
2015/0323471 A1 11/2015 Sapiens et al.
(Continued)

FOREIGN PATENT DOCUMENTS

KR 2021/0065007 A 6/2021
KR 2021/0109050 A 9/2021
(Continued)

*Primary Examiner* — Michael A Lyons
(74) *Attorney, Agent, or Firm* — HARNESS, DICKEY & PIERCE, P.L.C.

(57) ABSTRACT

A semiconductor measurement apparatus may include an illumination unit configured to irradiate light to the sample, an image sensor configured to receive light reflected from the sample and output multiple interference images representing interference patterns of polarization components of light, an optical unit in a path through which the image sensor receives light and including an objective lens above the sample, and a control unit configured to obtain, by processing the multi-interference image, measurement parameters determined from the polarization components at each of a plurality of azimuth angles defined on a plane perpendicular to a path of light incident to the image sensor. The control unit may be configured to determine a selected critical dimension to be measured from a structure in the sample based on measurement parameters. The illumination unit and/or the optical unit may include a polarizer and a compensator having a ¼ wave plate.

14 Claims, 34 Drawing Sheets

(56) References Cited

U.S. PATENT DOCUMENTS

| | | |
|---|---|---|
| 2016/0161245 A1 | 6/2016 | Fu et al. |
| 2017/0025149 A1* | 1/2017 | Ahner ................ G01N 21/8806 |
| 2017/0160075 A1 | 6/2017 | Kreuzer et al. |
| 2020/0240907 A1 | 7/2020 | Wang et al. |
| 2020/0243400 A1 | 7/2020 | Wang et al. |
| 2021/0242060 A1* | 8/2021 | Krishnan ........... G01N 21/9501 |
| 2022/0003535 A1 | 1/2022 | Hidaka |
| 2022/0074848 A1 | 3/2022 | Jung et al. |
| 2022/0404143 A1* | 12/2022 | Pandev ............... G03F 7/70633 |
| 2023/0057928 A1* | 2/2023 | Zawaideh .......... G01N 33/4833 |
| 2023/0152213 A1* | 5/2023 | Hidaka ................. G01N 21/45 |
| | | 356/365 |
| 2023/0400404 A1 | 12/2023 | Choi et al. |

FOREIGN PATENT DOCUMENTS

| | | |
|---|---|---|
| KR | 2022/0004544 A | 1/2022 |
| KR | 2022/0032922 A | 3/2022 |
| KR | 10-2023-0170217 A | 12/2023 |

* cited by examiner

600

610

620

630

SEMICONDUCTOR MEASUREMENT APPARATUS

CROSS-REFERENCE TO RELATED APPLICATION(S)

This application claims benefit of priority to Korean Patent Application No. 10-2022-0138580, filed on Oct. 25, 2022 in the Korean Intellectual Property Office, the disclosure of which is incorporated herein by reference in its entirety.

BACKGROUND

Example embodiments of the present disclosure relate to a semiconductor measurement apparatus.

A semiconductor measurement apparatus may be an apparatus for measuring a critical dimension of a structure in a sample, including a structure formed by a semiconductor process. Generally, a semiconductor measurement apparatus may measure a critical dimension using ellipsometry. Generally, the ellipsometry may irradiate light to a sample at a fixed azimuth and incidence angle and then determine a critical dimension of a structure included in the light-irradiated region of the sample using spectral distribution of light reflected from the sample. As a critical dimension of a structure formed by a semiconductor process has gradually decreased, the effect of changes in a critical dimension other than a critical dimension to be measured on spectral distribution may increase. Accordingly, determining the critical dimension to be measured may not be accurate with the spectral distribution obtained from ellipsometry.

SUMMARY

An example embodiment of the present disclosure provides a semiconductor measurement apparatus which may, by obtaining data for determining a critical dimension in overall azimuths and a wide range of incidence angles by imaging once, and determining a critical dimension using parameters other than intensity difference and phase difference of a polarization component of light, accurately determine a selected critical dimension despite interaction between different critical dimensions.

According to an example embodiment of the present disclosure, a semiconductor measurement apparatus may include an illumination unit including a light source and an illumination optical system, the illumination optical system in a path of light emitted from the light source; a light receiving unit including a light-receiving optical system and an image sensor, the light-receiving optical system in a path of light passing through the illumination optical system and reflected from a sample, and the image sensor configured to output an original image by receiving light passing through the light-receiving optical system; and a control unit. The control unit may be configured to determine, by processing the original image, a selected critical dimension among critical dimensions of a structure included in a region of the sample to which light is incident. One of the illumination optical system and the light-receiving optical system may include a compensator. An other one of the illumination optical system and the light-receiving optical system may include a plurality of beam displacers. The control unit may be configured to obtain the original image in which a peak appears due to interference while rotating the compensator, to select regions in which a peak appears in the original image and to obtain a plurality of sample images, to determine a plurality of elements included in a Mueller matrix using the plurality of sample images, and to identify a selected critical dimension based on the plurality of elements.

According to an example embodiment of the present disclosure, a semiconductor measurement apparatus may include an illumination unit configured to irradiate light to a sample; an image sensor configured to receive light reflected from the sample and to output multiple interference images representing interference patterns of polarization components of light; an optical unit in a path through which the image sensor receives light, the optical unit including an objective lens above the sample; and a control unit configured to obtain, by processing the multi-interference images, measurement parameters determined from the polarization components at each of a plurality of azimuth angles defined on a plane perpendicular to a path of light incident to the image sensor. The control unit may be configured to determine a selected critical dimension to be measured from a structure included in the sample based on the measurement parameters. At least one of the illumination unit and the optical unit may include a compensator. The compensator may include a polarizer and a ¼ wave plate along a path of light.

According to an example embodiment of the present disclosure, a semiconductor measurement apparatus may include a light source configured to output light; a monochromator configured to transmit light of a desired wavelength band from light output by the light source; an illumination optical system in a path of light output by the monochromator; a light-receiving optical system in a path of light passing through the illumination optical system and reflected from a sample; an image sensor configured to output a plurality of self-interference images representing interference patterns of polarization components included in light passing through the light-receiving optical system; and a control unit configured to obtain the plurality of self-interference images from the image sensor while changing a polarization state of light by controlling at least one of the illumination optical system and the light-receiving optical system. The control unit may be configured to measure structures included in a region in which light is reflected from the sample using the plurality of self-interference images. An optical axis of light incident to the sample and an optical axis of light reflected from the sample may be perpendicular to a surface of the sample.

BRIEF DESCRIPTION OF DRAWINGS

The above and other aspects, features, and advantages of the present disclosure will be more clearly understood from the following detailed description, taken in combination with the accompanying drawings, in which.

DETAILED DESCRIPTION

Hereinafter, embodiments of the present disclosure will be described as follows with reference to the accompanying drawings.

Figure 1:
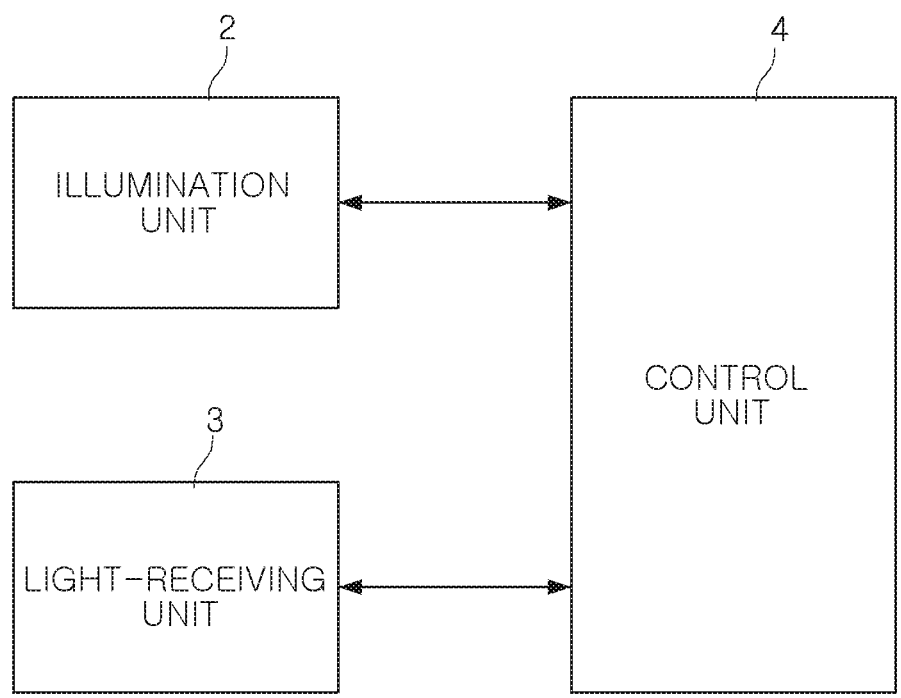
FIG. 1 is a block diagram illustrating a semiconductor measurement apparatus according to an example embodiment of the present disclosure.

FIG. 1 is a block diagram illustrating a semiconductor measurement apparatus according to an example embodiment.

Referring to FIG. 1, a semiconductor measurement apparatus 1 in an example embodiment may include an illumination unit 2, a light receiving unit 3, and a control unit 4. The illumination unit 2 may irradiate light on the sample to measure overlay error, critical dimension using the semiconductor measurement apparatus 1. For example, the illumination unit 2 may include a light source for outputting light in a wide wavelength band, a monochromator for receiving light output by the light source and selectively emitting (or transmitting) light in a specific wavelength band, and an illumination optical system disposed on a path through which light emitted (or transmitted) by the monochromator is incident to the sample.

The light receiving unit 3 may include an image sensor (e.g., CCD, camera) for receiving light reflected from the sample and outputting an original image, and a light-receiving optical system disposed on a path of light between the image sensor and the sample. The original image output by the image sensor may be transferred to the control unit 4. Also, the control unit 4 may control overall operation of the illumination unit 2 and the light receiving unit 3.

The control unit 4 may obtain a frequency-conversion image by converting the original image into a frequency domain. At least one peak may appear in the frequency-conversion image, and the peak may appear due to interference between polarization components of light generated in each of the illumination optical system and the light-receiving optical system. The control unit 4 may generate a sample image by selecting a region in which a peak appears in the frequency-conversion image, and configure a Mueller matrix necessary for analysis of polarization components of light using the sample image. For example, the control unit 4 may generate a plurality of elements included in the Mueller matrix using the sample image, and may determine a critical dimension, overlay of the patterns included in the sample based on the elements.

In an example embodiment, a polarization element for polarizing light may be included in each of the illumination optical system and the light-receiving optical system. For example, at least one of the illumination optical system and the light-receiving optical system may include a compensator as a polarization element. The compensator may include a polarizer and a ¼ wave plate (quarter wave plate), and while the control unit 4 rotates the compensator to polarize light, the image sensor of the light receiving unit 3 may output a plurality of original images. In this case, characteristics of interference between polarization components of light may appear differently in the plurality of original images.

In an example embodiment, when only one of the illumination optical system and the light-receiving optical system includes a compensator, the other thereof may include a plurality of beam displacers as polarization elements. Also, in an example embodiment, both the illumination optical system and the light-receiving optical system may include a compensator as a polarization element. Hereinafter, the semiconductor measurement apparatus 1 will be described in greater detail with reference to FIGS. 2 to 4.

Figure 2:
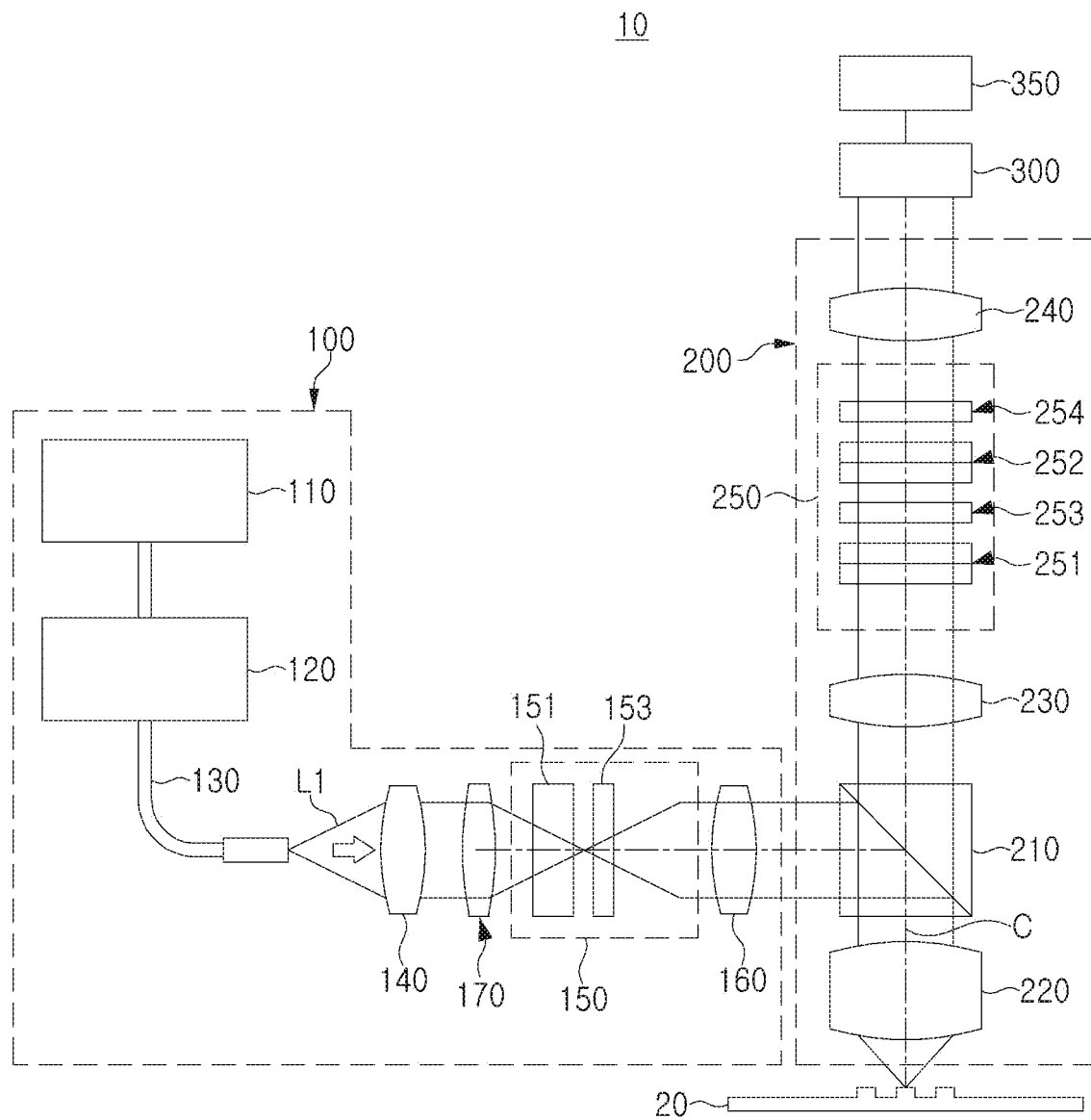
FIGS. 2 to 4 are diagrams illustrating a semiconductor measurement apparatus according to an example embodiment of the present disclosure.
Figure 3:
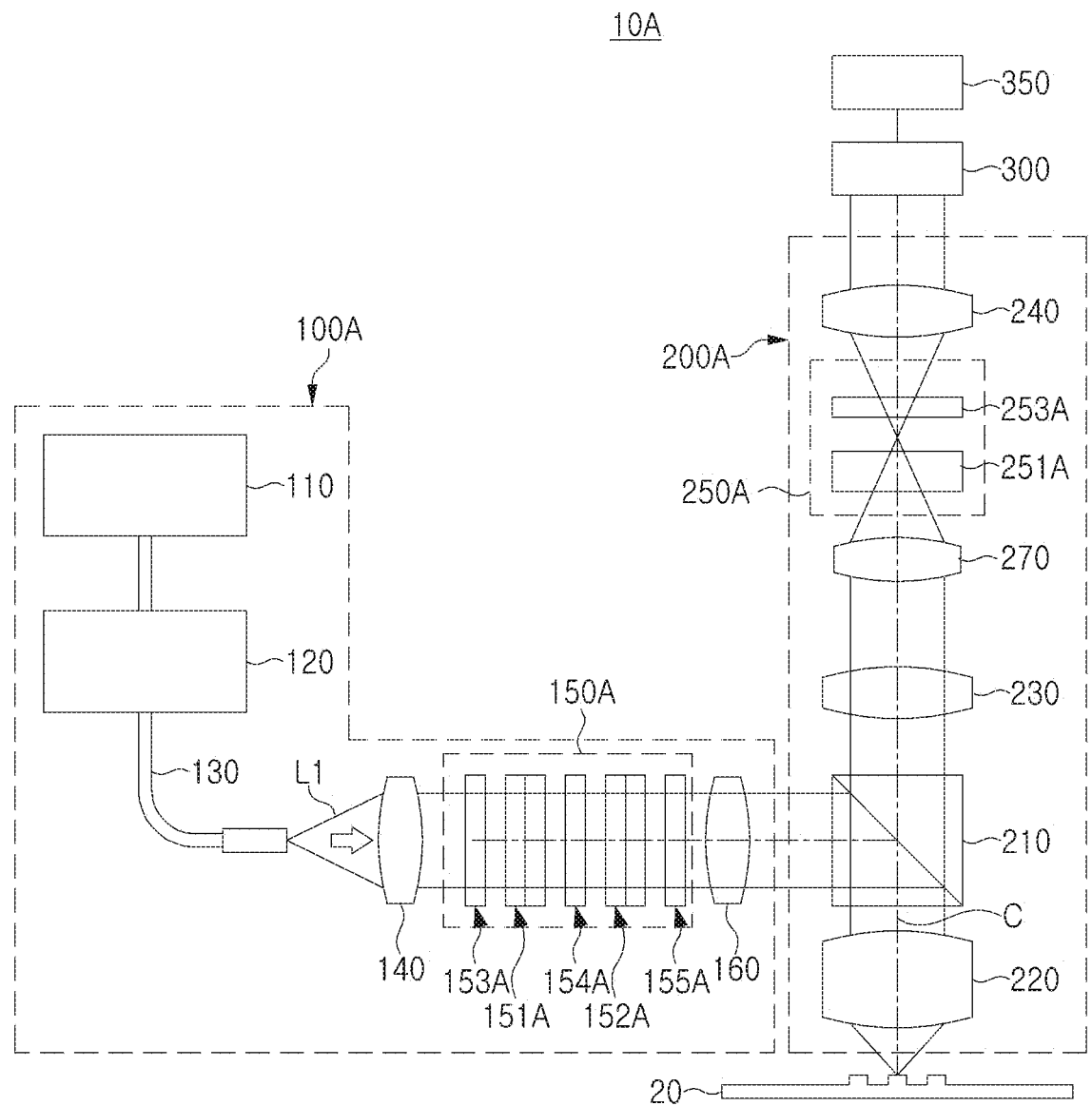
Figure 4:
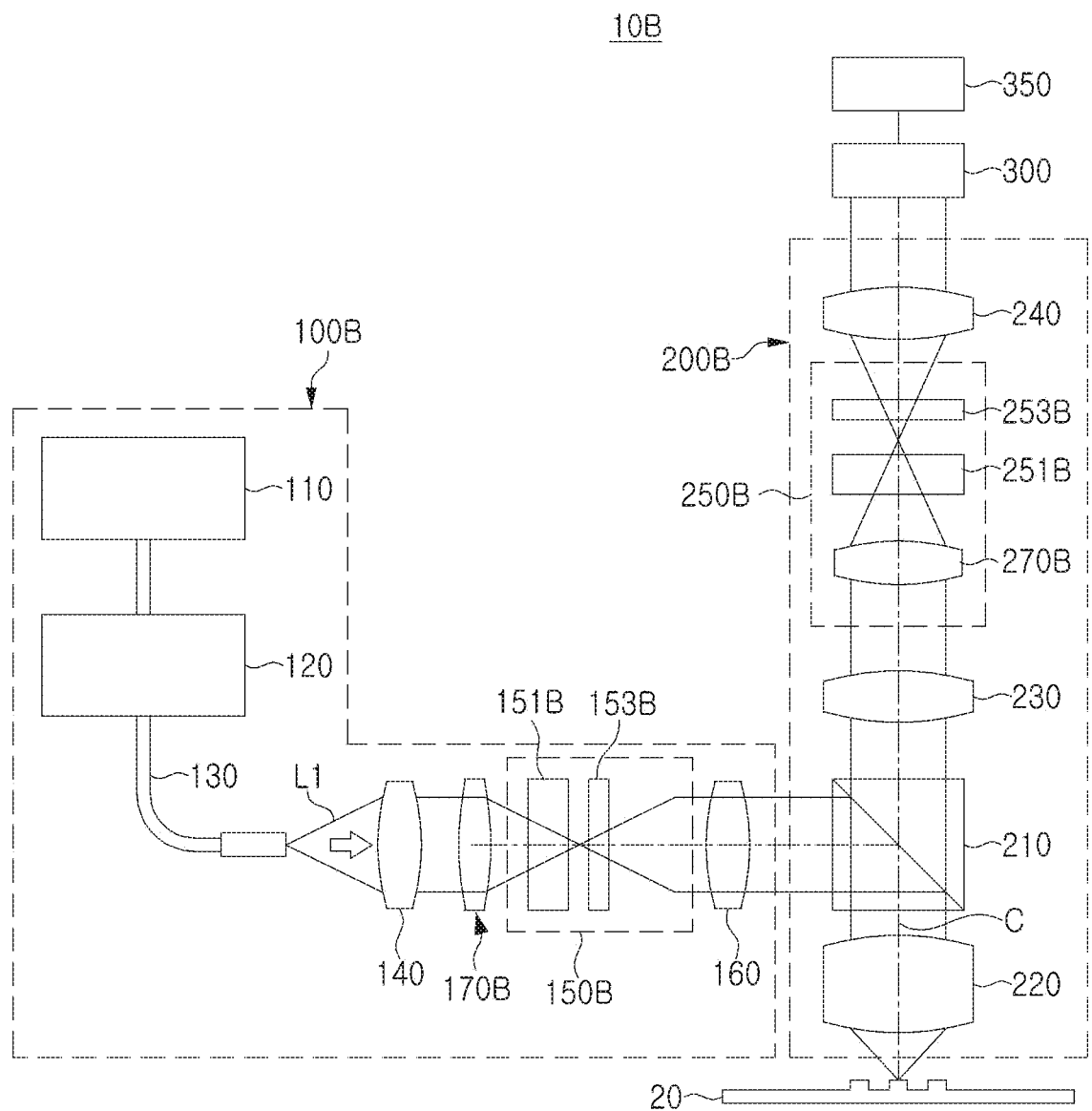

FIGS. 2 to 4 are diagrams illustrating a semiconductor measurement apparatus according to an example embodiment.

Referring first to FIG. 2, a semiconductor measurement apparatus 10 in an example embodiment may be implemented as a device using ellipsometry. As illustrated in FIG. 2, the semiconductor measurement apparatus 10 may include an illumination unit 100, an optical unit 200, an image sensor 300, and a control unit 350. The semiconductor measurement apparatus 10 may generate an image by receiving reflected light irradiated to the sample 20 by the illumination unit 100, and may measure a critical dimension, and overlay of the structure included in the sample 20 by analyzing the image.

The illumination unit 100 may include a light source 110 (e.g., laser), a monochromator 120, a fiber 130, illumination lenses 140 and 160, and an illumination optical system 150. The light source 110 may output light incident to the sample 20. For example, the light emitted from the light source 110 may be light including a wavelength range from an ultraviolet to an infrared wavelength, or may be monochromatic light having a specific wavelength in example embodiments. The monochromator 120 may select and emit (or transmit) a desired and/or alternatively predetermined wavelength band from light emitted by the light source 110. In an example embodiment, the monochromator 120 may irradiate light to the sample 20 while changing a wavelength band of light emitted from the light source 110. Accordingly, the sample 20 may be irradiated with light having various wavelength bands using the monochromator 120.

The fiber 130 may be a cable-shaped light guide member, and light incident to the fiber 130 may be irradiated to the first illumination lens 140. The first illumination lens 140 may be a convex lens, and may input light into the illumination optical system 150 by adjusting angular distribution of the light irradiated by the fiber 130. For example, the first illumination lens 140 may convert light L1 irradiated by the fiber 130 into parallel light. As illustrated in FIG. 2, a third illumination lens 170 may be further disposed between the first illumination lens 140 and the illumination optical system 150.

The illumination optical system 150 may polarize light passing through the first illumination lens 140 in a desired and/or alternatively predetermined polarization direction and may allow light incident to the sample 20. In the example embodiment illustrated in FIG. 2, the illumination optical system 150 may include a polarizer 151 and a wave plate 153. For example, the wave plate 153 may be a ¼ wave plate. The control unit 350 may adjust the polarization state of light incident to the sample 20 by rotating a compensator including the polarizer 151 and the wave plate 153. Light passing through the illumination optical system 150 may be incident to the beam splitter 210 of the optical unit 200 through the second illumination lens 160 which may be implemented as a convex lens. A motor, under the control of the control unit 350, may be used to rotate the compensator including the polarizer 151 and the wave plate 153.

The optical unit 200 may be included in a light receiving unit together with the image sensor 300. The beam splitter 210 of the optical unit 200 may partially reflect light received from the illumination unit 100 and may partially transmit light. Light reflected by the beam splitter 210 may be incident to the objective lens 220, and light passing through the objective lens 220 may be incident to the sample 20. For example, light passing through the objective lens 220 may be incident to be focused on a target region of the sample 20.

When light passing through the objective lens 220 is reflected from the target region of the sample 20, the objective lens 220 may receive reflected light again. In the example embodiment illustrated in FIG. 1, an optical axis C of light incident to and reflected from the sample 20 may be perpendicular to the surface of the sample 20. For example, the image sensor 300 may image a back focal plane of the objective lens 220.

Light irradiated to the sample 20 may include linearly polarized light in a specific direction. Light containing linearly polarized light may be condensed and incident to the target region of the sample 20, and depending on the incident angle determined based on the surface of the sample 20, light may include a P polarization component and an S polarization component. In light incident to the sample 20, the P polarization component may be reflected as the P polarization component, and the S polarization component may be reflected as the S polarization component.

Light reflected from the sample 20 may pass through the objective lens 220, the beam splitter 210, the first relay lens 230, the light-receiving optical system 250, and the second relay lens 240 in order, and may be incident to the image sensor 300. The first relay lens 230 may condense light passing through the beam splitter 210, may form an image, and allow light to be incident to the light-receiving optical system 250.

The light-receiving optical system 250 may include at least one light-receiving polarization element 251 or 252, a wave plate 253, and an analyzer 254. The first light receiving polarization element 251 and the second light receiving polarization element 252 may polarize light passing through the first relay lens 230, and each may include a pair of beam displacers. The wave plate 253 may be, for example, a half-wave plate. Light passing through the light-receiving optical system 250 may be incident to the image sensor 300 through the second relay lens 240. In some embodiments, the analyzer 254 may be a polarizer.

Each of the first and second light receiving polarization elements 251 and 252 may separate incident light into a first polarization component and a second polarization component. For example, the first light-receiving polarization element 251 may separate the incident light into a first polarization component and a second polarization component, and may output the first polarization component and the second polarization component by moving an optical axis of each of the components. The second light receiving polarization element 252 may separate light passing through the first light receiving polarization element 251 and polarized by a desired and/or alternatively predetermined angle by the wave plate 253 into a first polarization component and a second polarization component again.

Accordingly, a plurality of polarization components generated by the light-receiving optical system 250 may be incident to the image sensor 300 while interfering with each other, and accordingly, the image sensor 300 may generate multiple interference images as an original image. The polarization state of light incident to the sample 20 may be changed by the compensator included in the illumination optical system 150. Accordingly, the characteristics of interference between the polarization components displayed on the original image may vary depending on the angle at which the control unit 350 rotates the compensator in the illumination optical system 150. The image sensor 300 may output an original image to the control unit 350, and the control unit 350 may determine the critical dimension of the structure included in the region in which light is irradiated in the sample 20 by processing the original image.

For example, the control unit 350 may obtain a frequency-conversion image by converting the original image into a frequency domain, and may select regions represented by peaks caused by interference between a plurality of polarization components in the frequency-conversion image. The control unit 350 may obtain a plurality of sample images by frequency-inverse transforming each of the selected regions, and may determine a plurality of elements included in an N×N matrix using the plurality of sample images. For example, the N×N matrix may be a Mueller matrix.

In an example embodiment, the control unit 350 may obtain four original images while rotating a compensator included in the illumination unit 100 at four different angles. For example, while the illumination unit 100 irradiates light to the sample 20 in a state in which the compensator is rotated at a first angle, the image sensor 300 may obtain a first original image using light passing through the optical unit 200. The control unit 350 may convert the first original image into a first frequency-conversion image and may obtain four regions in which peaks appear due to interference between polarization components. Accordingly, when the control unit 350 obtains four original images while rotating the compensator at four different angles, the control unit 350 may determine a plurality of elements included in the Mueller matrix using 16 sample images.

By using the above method, the semiconductor measurement apparatus 10 may accurately measure the selected critical dimension to be measured among the critical dimensions of the structure of the sample 20. Generally, the critical dimension of the structure formed on the sample 20 may be determined using spectral distribution according to a wavelength of light reflected from the sample 20. However, in this case, it may be difficult to accurately measure the selected critical dimension due to an interaction in which a critical dimension other than the selected critical dimension to be determined affects the spectral distribution.

In an example embodiment, a plurality of elements included in a Mueller matrix may be determined using a plurality of sample images extracted from an original image, and a selected critical dimension may be determined using the determined elements. Accordingly, influence of other critical dimensions may be reduced, performance of the semiconductor measurement apparatus 10 may improve, and yield of a semiconductor process may improve.

A semiconductor measurement apparatus 10A according to an example embodiment illustrated in FIG. 3 may be a device using an ellipsometry similar to the semiconductor measurement apparatus 10 described with reference to FIG. 2. However, as illustrated in FIG. 3, the illumination optical system 150A of the illumination unit 100A may include a plurality of illumination polarization elements 151A-153A and wave plates 154A and 155A instead of a compensator. For example, the illumination optical system 150A may include a first illumination polarization element 151A, a second illumination polarization element 152A, and a third illumination polarization element 153A. Each of the first lighting polarization element 151A and the second lighting polarization element 152A may include a pair of beam displacers, and the third lighting polarization element 153A may be a polarizer. However, in example embodiments, each of the first lighting polarization element 151A and the second lighting polarization element 152A may be implemented as at least one of a Nomarski prism, a Wollaston prism, and a lotion prism. The wave plate 154A may be a half wave plate but is not limited thereto.

Accordingly, light output by the light source 110 may be decomposed into a plurality of polarization components in the illumination optical system 150A, may be incident to the sample 20, and may be reflected. Light reflected from the sample 20 may pass through the optical unit 200A and may be incident to the image sensor 300, and the control unit 350 may receive multiple interference images output by the image sensor 300 as original images.

In the example embodiment illustrated in FIG. 3, the optical unit 200A may include a compensator including a polarizer 251A and a wave plate 253A instead of a plurality of light receiving polarization elements. The wave plate 253A may be a ¼ wave plate, and a third relay lens 270 may be disposed between the compensator and the first relay lens 230. The control unit 350 may obtain a plurality of original images while rotating a compensator included in the optical unit 200A.

For example, similarly to the example described with reference to FIG. 2, the control unit 350 may obtain four original images from the image sensor 300 while rotating the compensator at four different angles. The control unit 350 may generate frequency-conversion images by converting each of the four original images into a frequency domain, and obtains sample images by selecting regions in which peaks appear due to interference between polarization components in the frequency-conversion images.

For example, as illustrated in FIG. 3, assuming that the illumination optical system 150A includes two pairs of beam displacers and the control unit 350 obtains four original images while rotating the compensator of the light-receiving optical system 250A at four different angles, the control unit 350 may obtain 16 sample images from 4 original images. The control unit 350 may determine elements included in a 4×4 Mueller matrix based on 16 sample images, and may determine critical dimensions, overlays of structures included in the sample 20 based on the determined elements.

A semiconductor measurement apparatus 10B according to an example embodiment illustrated in FIG. 4 may be implemented as a device using an ellipsometry similar to the semiconductor measurement apparatuses 10 and 10A described with reference to FIGS. 2 and 3. In an example embodiment illustrated in FIG. 4, both the illumination optical system 150B of the illumination unit 100B and the light-receiving optical system 250B of the optical unit 200B may include compensators. In each of the illumination optical system 150B and the light-receiving optical system 250B, the compensator may consist of a polarizer and a wave plate, and the wave plate may be a ¼ wave plate.

The control unit 350 may receive multiple interference images output by the image sensor 300 while rotating a compensator included in each of the illumination optical system 150B and the light-receiving optical system 250B. For example, each of the compensators of the illumination optical system 150B and the light-receiving optical system 250B may be rotated to one of first to fourth angles. The control unit 350 may receive four original images from the image sensor 300 while determining the compensator of the illumination optical system 150B to the first angle and rotating the compensator of the light-receiving optical system 250B to the first to fourth angles.

Accordingly, the control unit 350 may obtain 16 original images by combining rotation angles of compensators included in each of the illumination optical system 150B and the light-receiving optical system 250B. The number of original images received by the control unit 350 from the image sensor 300 may vary according to the number of pairs of rotation angles of compensators included in each of the illumination optical system 150B and the light-receiving optical system 250B.

The method of measuring the critical dimension and overlay of the structures included in the sample 20 by the control unit 350 using the original images may be similar to the example described above with reference to FIGS. 2 and 3. For example, the control unit 350 may obtain frequency-conversion images by converting each of the original images into a frequency domain, and may generate sample images by selecting regions in which peaks appear due to interference between polarization components in each of the frequency-conversion images. The control unit 350 may determine the elements of the Mueller matrix for analyzing the polarization state of light using the sample images, and may measure the critical dimension and overlay of the structures included in the sample 20 based on the determined elements.

In an example embodiment, as described with reference to FIGS. 2 to 4, at least one of the illumination unit 100, 100A, and 100B and the optical unit 200, 200A, and 200B is configured to include a compensator, and may obtain original images in which the interference between polarization components appears by adjusting the rotation angle of the compensator. Accordingly, as compared to the example in which both the illumination units 100, 100A, and 100B and the optical units 200, 200A, and 200B include polarization elements such as beam displacers, measurement stability of the semiconductor measurement apparatus 10 may be improved.

FIGS. 5A to 5D are diagrams illustrating a method of operating a semiconductor measurement apparatus according to an example embodiment.

FIGS. 5A to 5D may be diagrams illustrating partial regions of semiconductor devices 400 and 400A-400C corresponding to a sample of a semiconductor measurement apparatus according to an example embodiment. The semiconductor devices 400 and 400A-400C may include a plurality of semiconductor elements.

Figure 5A:
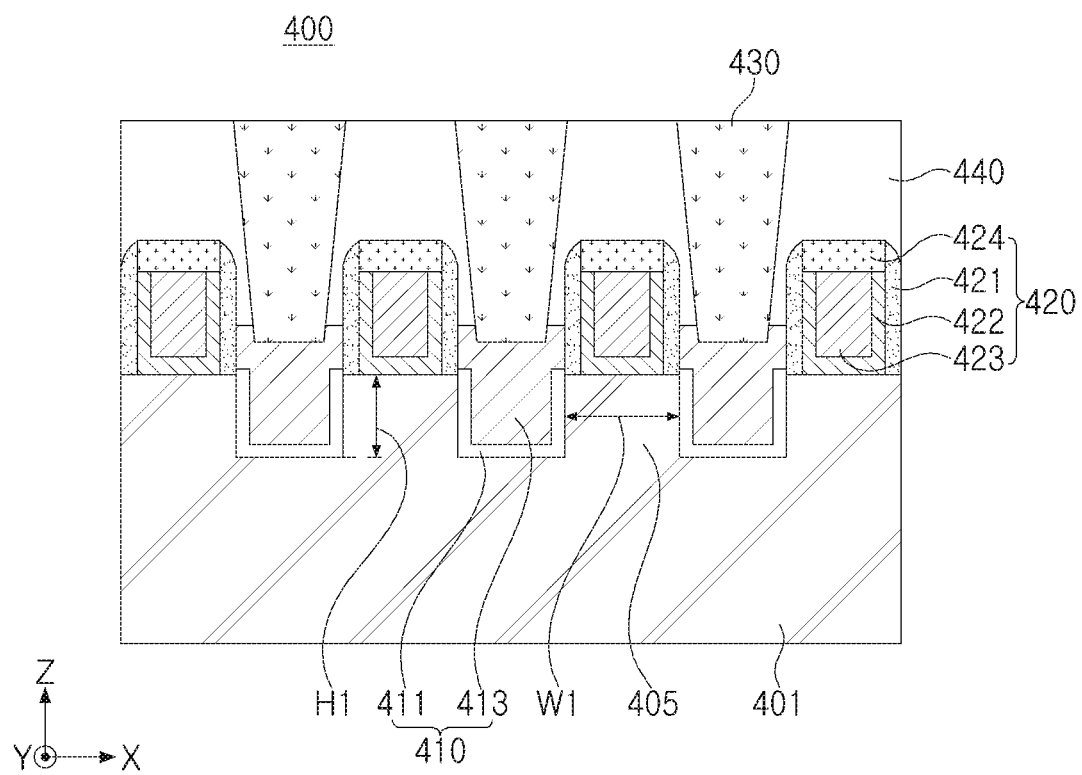
FIGS. 5A to 5D are diagrams illustrating a method of operating a semiconductor measurement apparatus according to an example embodiment of the present disclosure.

Referring to FIG. 5A, the semiconductor device 400 may include a substrate 401, source/drain regions 410, gate structures 420, source/drain contacts 430, and an interlayer insulating layer 440. However, merely a partial region of the semiconductor device 400 is illustrated, and the semiconductor device 400 may further include wiring patterns, gate contacts, a plurality of pad regions, and guard patterns.

The substrate 401 may include a semiconductor material, and a plurality of fin structures 405 protruding in a Z-axis direction perpendicular to an upper surface of the substrate 401 may be formed on the substrate 401. The plurality of fin structures 405 may be connected to the source/drain regions 410 on both sides in the X-axis direction, and may be in contact with the gate structures 420 in the Y-axis direction and the Z-axis direction. Each of the plurality of fin structures 405 may have a desired and/or alternatively predetermined height and width, and may provide a channel region.

Each of the source/drain regions 410 may include a first source/drain layer 411 and a second source/drain layer 413. The first source/drain layer 411 may be in direct contact with the substrate 401 and the plurality of fin structures 405, and the second source/drain layer 413 may be formed through a selective epitaxial growth process using the first source/drain layer 411. The second source/drain layer 413 may be connected to the source/drain contacts 430. The source/drain contacts 430 may be disposed in the interlayer insulating layer 440 and may be formed of a material such as metal or metal silicide. In example embodiments, the source/drain contacts 430 may include a plurality of layers formed of different materials.

Each of the plurality of gate structures 420 may include a gate spacer 421, a gate insulating layer 422, a gate electrode layer 423, and a capping layer 424. For example, a semiconductor device may be provided by one of the plurality of gate structures 420 and the source/drain regions 410 on both sides thereof.

In an example embodiment illustrated in FIG. 5A, the plurality of fin structures 405 may have a first height H1 and a first width W1. Among the critical dimensions of the plurality of fin structures 405, the first height H1 or the first width W1 may be measured using the semiconductor measurement apparatus in an example embodiment.

However, depending on the characteristics of the semiconductor device 400, the height and width of the plurality of fin structures 405 may vary. Also, a change in the width of the plurality of fin structures 405 may affect the spectral distribution for measuring the height of the plurality of fin structures 405. Accordingly, when the semiconductor measurement apparatus intends to measure the heights of the plurality of fin structures 405 by obtaining the spectral distribution, the spectral distribution obtained to measure the heights by changing the widths of the plurality of fin structures 405 may not be accurately generated, and accordingly, errors may occur in the measurement.

Figure 5B:
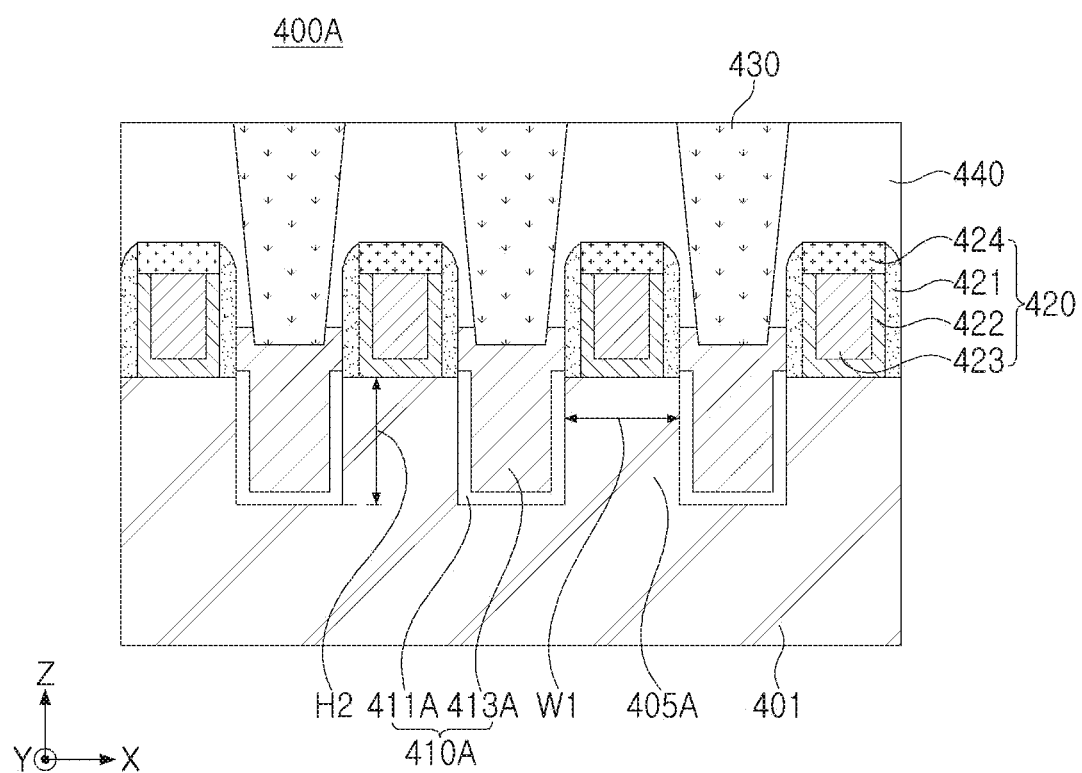

In the example embodiment illustrated in FIG. 5B, the semiconductor device 400A may include a plurality of fin structures 405A having a height greater than that of the semiconductor device 400 according to the example embodiment illustrated in FIG. 2. Referring to FIG. 5B, the plurality of fin structures 405A may have a second height H2 greater than the first height H1, and accordingly, the shapes of the source/drain regions 410A may also vary.

Figure 5C:
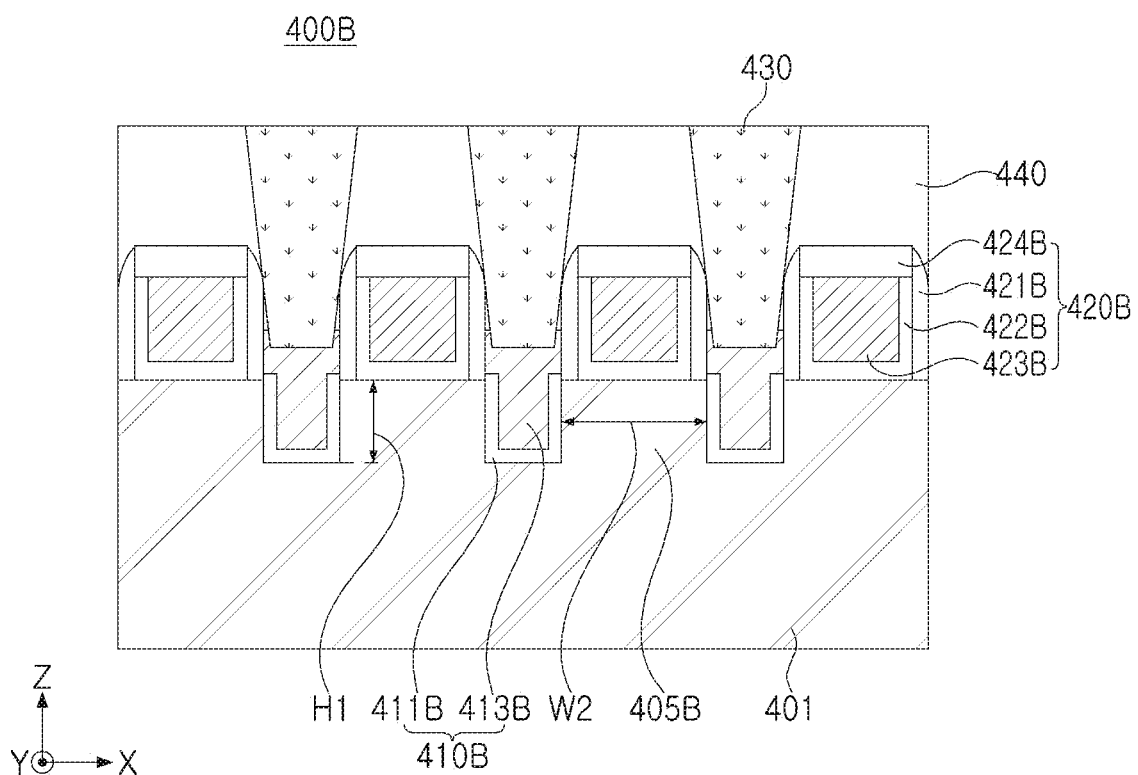

Referring to FIG. 5C, the semiconductor device 400B may include a plurality of fin structures 405B having a height and a width greater than those of the semiconductor device 400 according to the example embodiment illustrated in FIG. 2. Referring to FIG. 5C, the plurality of fin structures 405B may have a second width W2 greater than the first width W1, and accordingly, the shapes of the source/drain regions 410B may also vary.

Figure 5D:
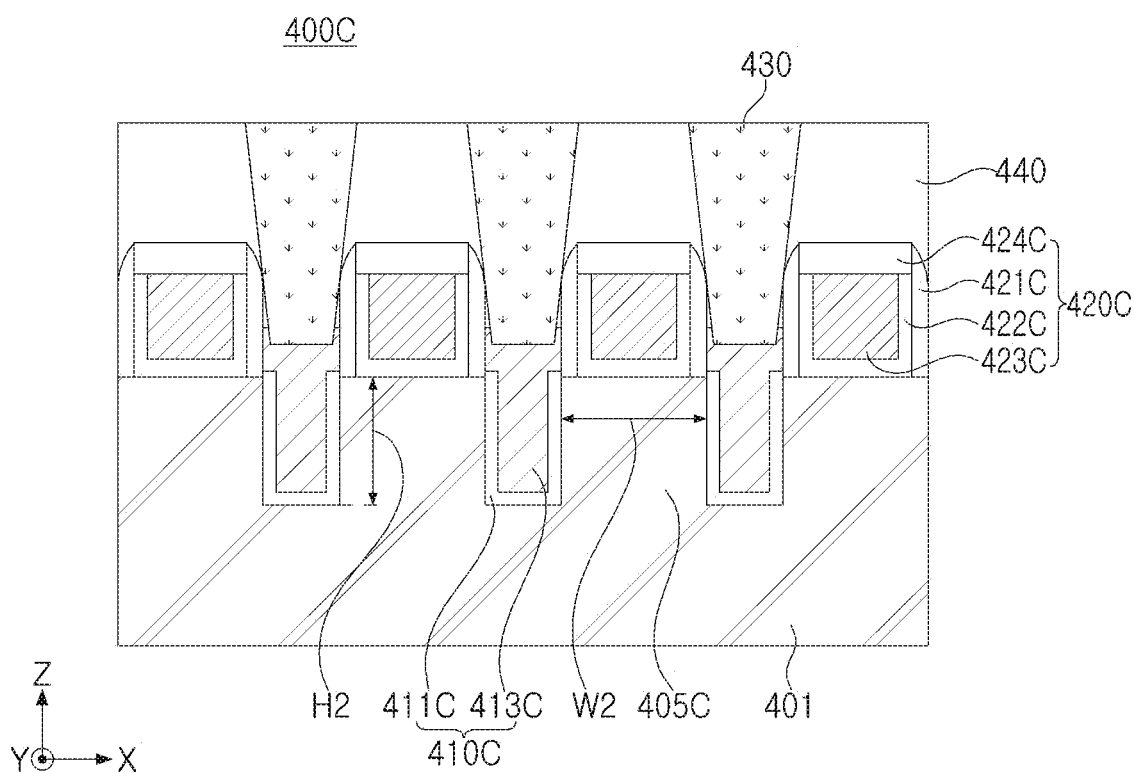

In the example embodiment illustrated in FIG. 5D, both the height and width of the plurality of fin structures 405C included in the semiconductor device 400C may be increased. Referring to FIG. 5D, the plurality of fin structures 405C may have a second height H2 greater than the first height H1 and a second width W2 greater than the first width W1.

As an example, the spectral distribution obtained to measure the heights of the plurality of fin structures 405 in the semiconductor device 400 according to the example embodiment illustrated in FIG. 5A may be different from the spectral distributions obtained to measure the heights of the plurality of fin structures 405A to 405C in the semiconductor devices 400A-400C according to example embodiments illustrated in FIGS. 5B to 5D.

However, as the structures included in the semiconductor devices 400 and 400A-400C are gradually miniaturized, it may be difficult to identify whether the difference between the spectral distributions obtained in the semiconductor devices 400A to 400C according to the example embodiments illustrated in FIGS. 5B to 5D is caused by a height change or a width change. For example, the plurality of fin structures 405A to 405C may be formed by etching partial regions of the substrate 401. When the height of the plurality of fin structures 405A to 405C is to be increased, the height and also the width of the plurality of fin structures 405A to 405C may be increased by an etching process. In this case, it may be difficult to identify which of the height change and the width change of the plurality of fin structures 405A-405C more influenced the change in the spectrum distribution output by the semiconductor measurement apparatus, and accordingly, it may be difficult to determine the desired critical dimension.

Different critical dimensions, such as height and width, may have different sensitivities to the measurement conditions of the semiconductor measurement apparatus. For example, desired and/or alternatively predetermined azimuth angle and incident angle conditions may have a higher sensitivity to height than width. Considering these characteristics, by obtaining spectral distributions from the semiconductor devices 400A-400C under various azimuth angle and incident angle conditions, a desired critical dimension may be more accurately measured. However, since the azimuth angle and incident angle which may be controlled in the semiconductor measurement apparatus may be generally limited, there may be limitations in the above method.

As described above with reference to FIGS. 2 to 4, the semiconductor measurement apparatus in an example embodiment may irradiate light having an optical axis perpendicular to the surface of the sample, may receive reflected light, and may determine the critical dimension of the structure included in the sample. Accordingly, data corresponding to the entire azimuth angle from 0 degrees to 360 degrees may be obtained with one imaging, and data corresponding to a wide range of incident angles according to the numerical aperture of the objective lens may also be obtained with one imaging. Accordingly, among various azimuth angles and incident angles, data corresponding to the azimuth angle and incident angle, which are most sensitive to the critical dimension to be measured, may be selected and the critical dimension may be determined based on the spectral distribution thereof. Accordingly, by accurately determining only the critical dimension to be measured regardless of the interaction between critical dimensions affecting each other in structures having fine dimensions, the efficiency of the process using the semiconductor measurement apparatus may be improved.

Also, in an example embodiment, a critical dimension and overlay may be determined using elements of a Mueller matrix which may fully represent the difference in intensity or a phase difference between polarization components of light and also the polarization state of light. Accordingly, as described with reference to FIGS. 5A to 5D, a desired selected critical dimension among critical dimensions having interaction therebetween may be accurately measured.

To determine the elements of the Mueller matrix as above, sample images generated by interference between polarization components of light may be necessary. Each of the illumination optical system and the light-receiving optical system of the semiconductor measurement apparatus may include beam displacers to generate sample images. However, in the process of separating and interfering light into polarization components in each beam displacer, the polarization components of light may not be accurately separated and interfered, and accordingly, measurement stability of the semiconductor measurement apparatus may deteriorate.

As described above with reference to FIGS. 2 to 4, in an example embodiment, light may be separated into polarization components using compensators instead of beam displacers in at least one of an illumination optical system and a light-receiving optical system and the components may be interfered with each other. The control unit of the semiconductor measurement apparatus may separate light into polarization components by adjusting the rotation angle of the compensator and may allow the component to be interfered with each other, and the interaction between different critical dimensions may be overcome and the desired selected critical dimension may be accurately measured, thereby securing measurement stability of the semiconductor measurement apparatus.

Figure 6:
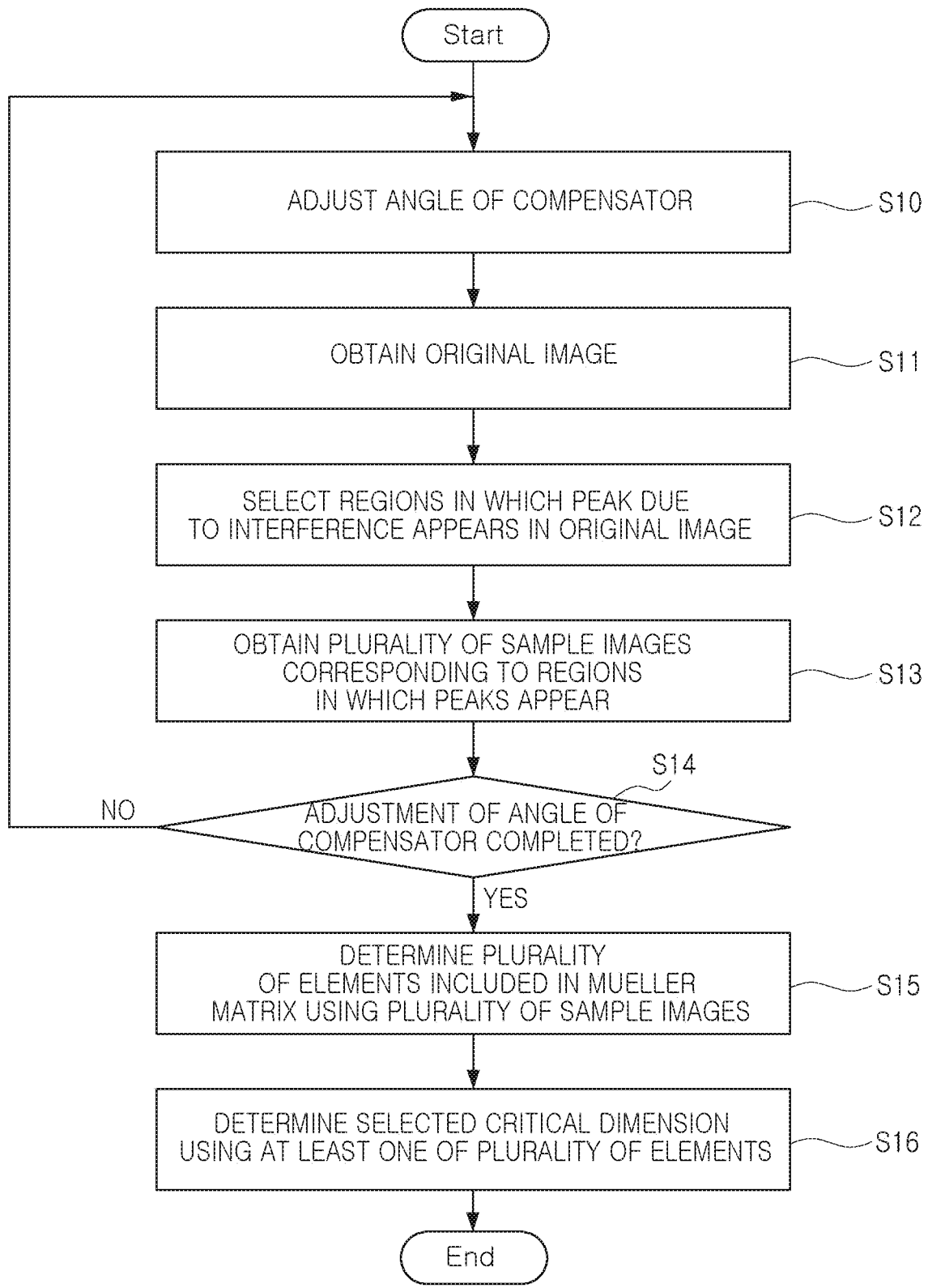
FIGS. 6 and 7 are flowcharts illustrating a measurement method using a semiconductor measurement apparatus according to an example embodiment of the present disclosure.
Figure 7:
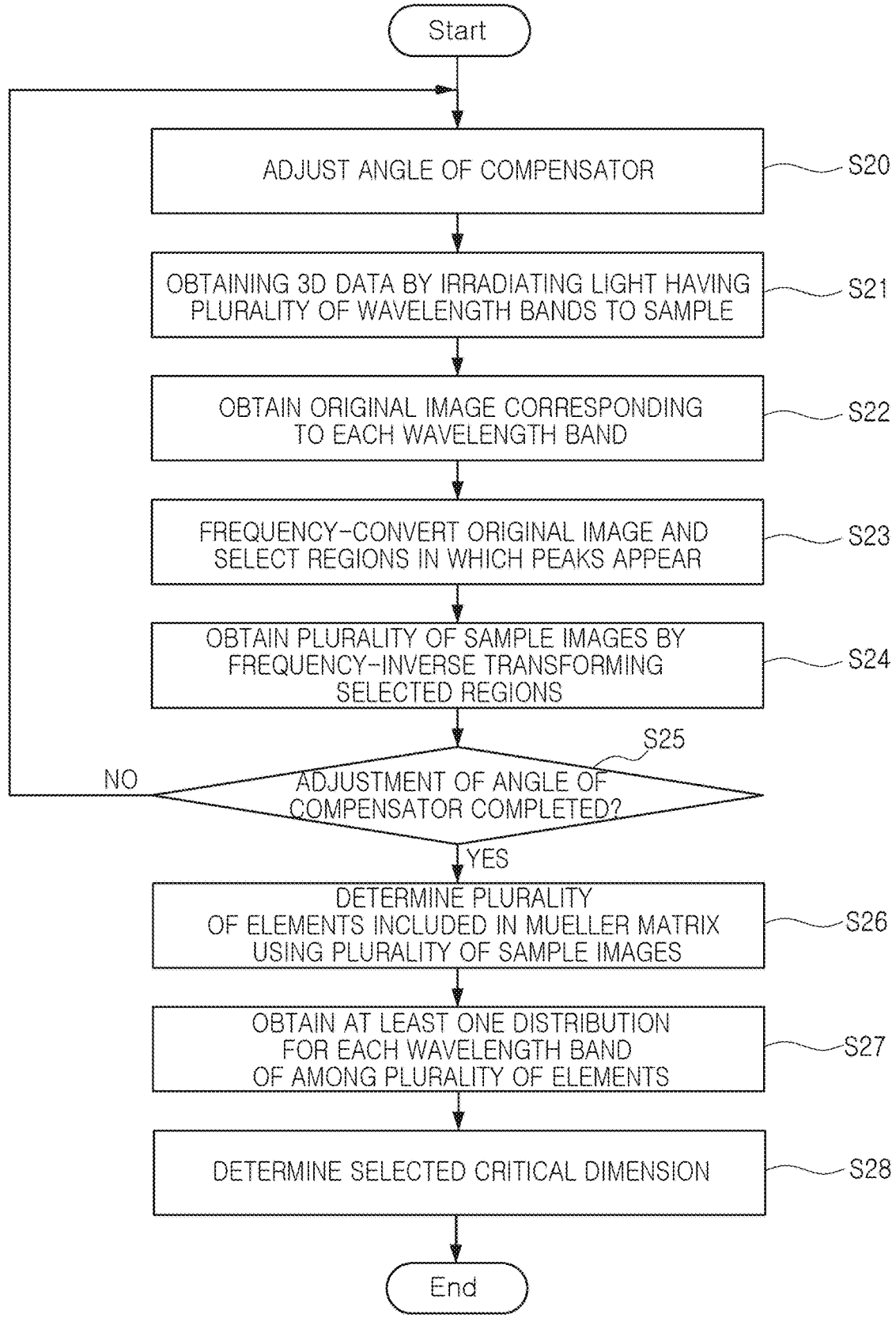

FIGS. 6 and 7 are flowcharts illustrating a measurement method using a semiconductor measurement apparatus according to an example embodiment.

Referring first to FIG. 6, the measurement method in an example embodiment may start with adjusting the angle of a compensator by a control unit (S10). As described above, the compensator may be included in at least one of an illumination optical system and a light-receiving optical system of the semiconductor measurement apparatus. In example embodiments, one of the illumination optical system and the light-receiving optical system may include polarization elements implemented as beam displacers instead of compensators.

The control unit may obtain an original image after adjusting the angle of the compensator (S11). The original image may be an image generated by imaging a back focal plane of an objective lens adjacent to the sample, or may be a self-interference image representing characteristics of interference between polarization components of light generated by a compensator.

The control unit may select regions in which a peak due to interference appears in the original image (S12). Here, interference may be between polarization components of light, and regions in which peaks appear in an image obtained by converting an original image into a frequency domain may be selected. The control unit may obtain a plurality of sample images corresponding to regions in which peaks appear (S13).

For example, assuming that the illumination optical system includes a compensator and the light-receiving optical system includes first and second light-receiving polarization elements each including a pair of beam displacers, by completing operations S10 to S13, the control unit may obtain four sample images. The Mueller matrix may be a matrix for handling a Stokes vector representing polarization components of light, and the Mueller matrix may represent light incident to the image sensor with 16 elements. In other words, the Mueller matrix representing the polarization state of light may be a 4×4 matrix, and all elements included in the Mueller matrix may not be determined using only four sample images. Accordingly, the control unit may determine whether adjustment of the angle of the compensator is completed after operation S13 is completed (S14).

In the case in which it is determined that adjustment of the angle of the compensator is not completed in operation S14, the control unit may rotate the compensator and may adjust the compensator to another angle, and may repeat operations S11 to S13. The control unit may, by repeatedly executing operations S11 to S13 in a state in which the compensator is rotated at each of a plurality of rotation angles, obtain a plurality of original images and may obtain a plurality of sample images from each of the plurality of original images. In an example embodiment, the control unit may obtain 16 sample images by repeatedly executing operations S11 to S13 while rotating the compensator to each of a plurality of rotation angles.

In the case in which it is determined that adjustment of the angle of the compensator is completed in operation S14, the control unit may determine elements included in the Mueller matrix using a plurality of sample images (S15). For example, 16 elements included in a 4×4 Mueller matrix may be determined based on a polynomial generated using 16 sample images.

When a plurality of elements are determined, the control unit may determine a selected critical dimension using at least one of the plurality of elements (S16). The selected critical dimension may be a critical dimension to be measured among critical dimensions of structures included in a sample in which light output by an illumination unit of the semiconductor measurement apparatus is reflected.

For example, the plurality of elements may be generated as data in image format, and the control unit may determine a selected critical dimension by comparing at least one of the plurality of elements with reference image data stored in library data. Alternatively, the control unit may determine the selected critical dimension by calculating a desired and/or alternatively predetermined measurement parameter, for example, a difference in intensity between the polarization components, a phase difference between polarization components, and a degree of polarization using a plurality of elements and comparing the parameter with a reference parameter stored in the library data.

Referring to FIG. 7, the measurement method in an example embodiment may start with adjusting the angle of the compensator by the control unit (S20). As described above with reference to FIG. 6, the compensator may be included in at least one of the illumination optical system and the light-receiving optical system of the semiconductor measurement apparatus, and the angle of the compensator may be adjusted by the control unit.

The control unit may start by obtaining 3D data by irradiating light having a plurality of wavelength bands to the sample by controlling the illumination unit (S21). The illumination unit of the semiconductor measurement apparatus may include a light source outputting light of a wide wavelength band, and a monochromator for selecting light of a specific wavelength band from light output by the light source. The control unit may radiate light having different wavelength bands to the sample by controlling the monochromator, and while light of each wavelength band is irradiated to the sample, the control unit may obtain multiple interference images generated by the interference of polarization components of light from the image sensor. Accordingly, since multiple interference images are generated in a plurality of wavelength bands, the control unit may obtain 3D data in which the multiple interference images are disposed according to the wavelength bands.

The control unit of the semiconductor measurement apparatus may obtain multiple interference images corresponding to each wavelength band as an original image (S22), and may frequency-convert the original image and may select regions in which peaks appear (S23). For example, the control unit may transform the original image into a frequency domain by applying a Fourier transform.

When regions represented by peaks are selected, the control unit may obtain a plurality of sample images by applying an inverse Fourier transform to the selected regions (S24). Prior to generating a plurality of sample images, digital filtering and centering may be performed on the selected regions in the frequency domain. By means of digital filtering and centering, in the two-dimensional data prior to inverse Fourier transformation, regions in which peaks appear may be aligned to be disposed in the center.

The control unit may determine whether adjustment of the angle of the compensator is completed (S25). At least one of the illumination optical system and the light-receiving optical system of the semiconductor measurement apparatus may include a compensator, and the control unit may allow separation and interference between polarization components of light to occur by rotating the compensator. In an example embodiment, a sample may be measured using the elements of the Mueller matrix to handle the Stokes vector representing the polarization components of light, and eventually, in order for the control unit to measure the sample, sufficient raw images may be necessary to determine the elements of the Mueller matrix. In an example embodiment, the control unit may obtain a plurality of original images for one wavelength band while adjusting the angle of the compensator, and the control unit may determine the elements of the Mueller matrix based on the images.

Accordingly, when it is determined that adjustment of the angle of the compensator is not completed in operation S25, the control unit may adjust the compensator to another angle by rotating the compensator, and may repeat operations S21 to S24 again. The control unit may, by repeatedly performing operations S21 to S24 in a state in which the compensator is rotated to each of a plurality of rotation angles, obtain a plurality of original images and may obtain a plurality of sample images from each of the plurality of original images. When it is determined that adjustment of the angle of the compensator is completed in operation S25, the control unit may determine elements included in the Mueller matrix using a plurality of sample images (S26). For example, 16 elements included in a 4×4 Mueller matrix may be determined based on a polynomial generated using 16 sample images.

The control unit may obtain a distribution for each wavelength band of at least one element among a plurality of elements (S27). As described above, a plurality of multiple interference images corresponding to each wavelength band may be generated while the illumination unit changes the wavelength band of light irradiated to the sample. Accordingly, a plurality of elements included in the Mueller matrix may also be generated as 3D data corresponding to a plurality of wavelength bands.

The control unit may select at least one element from among a plurality of elements and may obtain a distribution of each wavelength band of the at least one element. Since each of the plurality of elements is generated as data in an image format represented on a 2D plane, the control unit may select a specific pixel on the 2D plane and may obtain a distribution of values of the selected pixel for each wavelength band.

The control unit may determine the selected critical dimension using a distribution of at least one element for each wavelength band (S28). For example, an element having high sensitivity to a selected critical dimension among critical dimensions representing a structure included in a sample and a wavelength band having particularly high sensitivity to the selected critical dimension in the corresponding element may be present. The control unit may determine the selected critical dimension by selecting at least one element having high sensitivity from among a plurality of elements according to the selected critical dimension to be measured and referring to values of at least a portion of the pixels included in the element or the element in the wavelength band having high sensitivity by referring to the distribution of each wavelength band of the selected element.

However, in example embodiments, the measurement method described with reference to FIG. 7 may be performed in a different manner. For example, the control unit may obtain a plurality of original images for each wavelength band while changing the angle of the compensator while fixing the wavelength band of light irradiated to the sample. Also, the operation of obtaining the plurality of sample images using the original image by the control unit may be performed after completing the operation of obtaining the plurality of original images while adjusting the rotation angle of the compensator.

Figure 8:
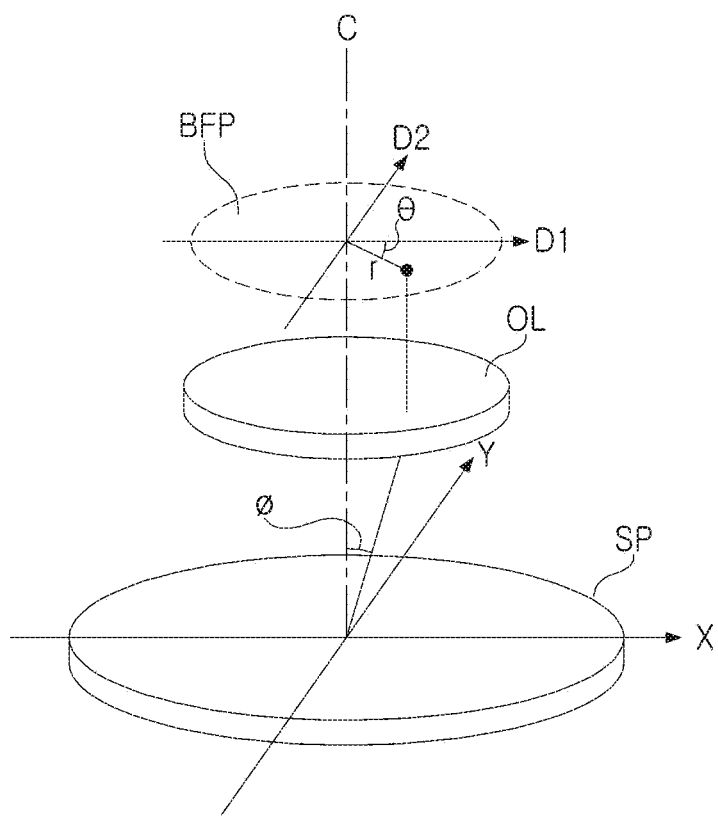
FIG. 8 is a diagram illustrating a method of operating a semiconductor measurement apparatus according to an example embodiment of the present disclosure.

FIG. 8 is a diagram illustrating a method of operating a semiconductor measurement apparatus according to an example embodiment.

Referring to FIG. 8, light may be irradiated to the surface of the sample SP, and the surface of the sample SP may be defined as an X-Y plane. The optical axis C may extend from the origin of the X-Y plane and may extend in a direction perpendicular to the X-Y plane, and the center of the objective lens OL adjacent to the sample SP may correspond to the optical axis C. The objective lens OL may include a front surface opposing the sample SP and a rear surface disposed on the opposite side of the sample SP, and a back focal plane BFP may be defined at a desired and/or alternatively predetermined distance from the rear surface of the objective lens OL.

The back focal plane BFP may be defined by the first direction D1 and the second direction D2, for example, the first direction D1 may be the same as the X-direction of the surface of the sample SP, and the second direction D2 may be the same as the Y-direction. Light passing through the objective lens OL may be condensed on the target region of the sample SP in the form of a point, may be reflected from the target region, may pass through the objective lens OL and may travel to the back focal plane BFP. As described above, in the semiconductor measurement apparatus in an example embodiment, light may be incident to the sample SP at an entire azimuth angle including 0 to 360 degrees, and the range of the incident angle ($\varphi$) of light incident to the sample SP may be determined according to the numerical aperture of the objective lens OL.

In an example embodiment, an objective lens OL having a numerical aperture of 0.8 or more and less than 1.0 may be employed in the semiconductor measurement apparatus such that data for a wide range of incident angles obtained with one imaging performed by an image sensor may be obtained. For example, the maximum incident angle of light passing through the objective lens OL may be greater than or equal to 72 degrees and may be less than 90 degrees. For example, the image sensor may be disposed such that the light receiving surface may be disposed in a position conjugate to the position of the back focal plane of the objective lens.

When each coordinate included in the back focal plane BFP defined by the first direction D1 and the second direction D2 is represented by polar coordinates (r, θ), as illustrated in FIG. 8, the first coordinates (r) may be determined by the incident angle (φ). The second coordinate (θ) may be a value indicating how much the coordinate is rotated with respect to the first direction D1, and accordingly, the second coordinate may be equal to the azimuth angle of light incident to the sample SP, and may have a value of 0 to 360 degrees.

Accordingly, in the semiconductor measurement apparatus in an example embodiment, data including interference patterns an azimuth angle from 0 to 360 degrees and an incident angle determined by the numerical aperture of the objective lens OL may be obtained in the form of an image. Accordingly, differently from the general method which may require performing imaging multiple times while changing the position and angle of the illumination unit irradiating light to the sample SP or of the sample, the data necessary to analyze and measure the target region of the sample SP may be obtained with only one imaging, and efficiency of the measurement process using the semiconductor measurement apparatus may be improved.

FIGS. 9 to 14 are diagrams illustrating a polarization element included in a semiconductor measurement apparatus according to an example embodiment.

FIGS. 9 to 14 may be diagrams illustrating a process in which polarization components of light are separated by a polarization element included in a semiconductor measurement apparatus. In the example embodiment described with reference to FIGS. 9 to 14, the X-Y plane 500 may be perpendicular to an optical axis of light emitted from an illumination unit of a semiconductor measurement apparatus or light reflected from a sample. Hereinafter, for ease of description, the example embodiment will be described assuming the illumination polarization elements included in an illumination unit of the semiconductor measurement apparatus.

Figure 9:
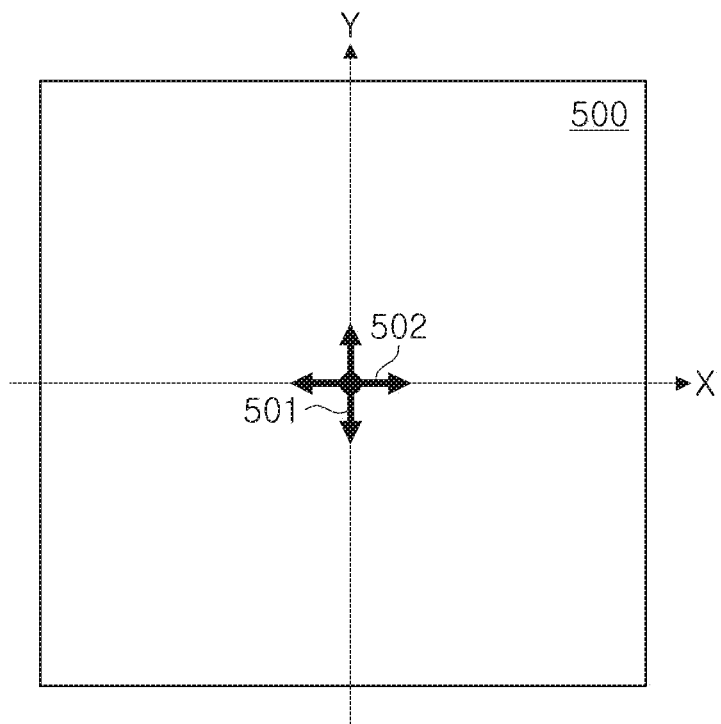
FIGS. 9 to 14 are diagrams illustrating a polarization element included in a semiconductor measurement apparatus according to an example embodiment of the present disclosure.

Referring to FIG. 9, an optical axis of light emitted from the illumination unit may be disposed at the origin of the X-Y plane 500. Light incident to the X-Y plane 500 may include a first polarization component 501 and a second polarization component 502, and the characteristics of light may be determined by the intensity and phase of each of the first polarization component 501 and the second polarization component 502.

Each of the first illumination polarization element and the second illumination polarization element included in the illumination unit may include a pair of beam displacers. For example, one of the pair of beam displacers may only separate and move the first polarization component 501, and the other thereof may only separate and move the second polarization component 502.

Figure 10:
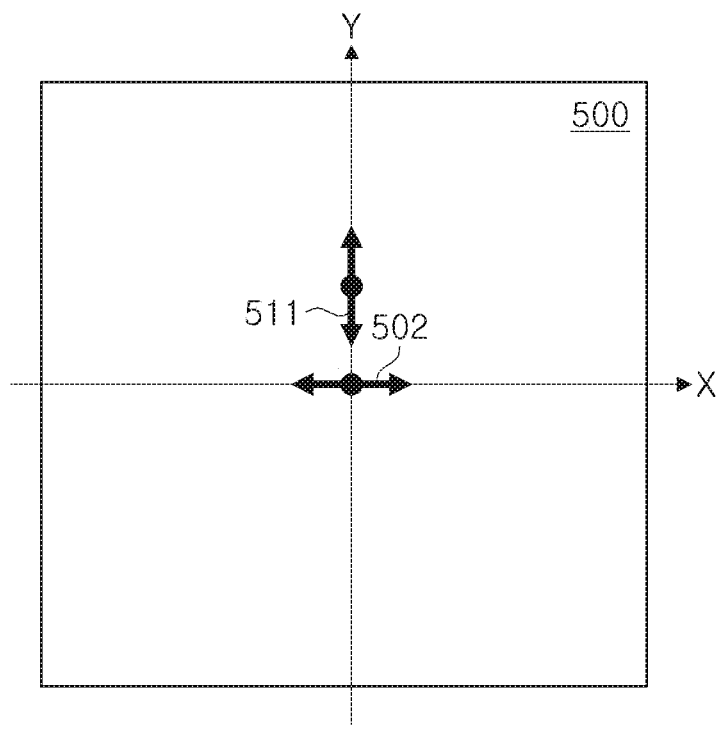

FIG. 10 may be a diagram illustrating polarization components of light passing through a first beam displacer among a pair of beam displacers included in a first lighting polarization element. Referring to FIGS. 9 and 10, the first beam displacer of the first lighting polarization element may only separate and move the first polarization component 501. Accordingly, as illustrated in FIG. 10, in light passing through the first beam displacer of the first lighting polarization element, the first polarization component 511 may be disposed at the first coordinate C1, rather than the origin of the X-Y plane 500.

Figure 11:
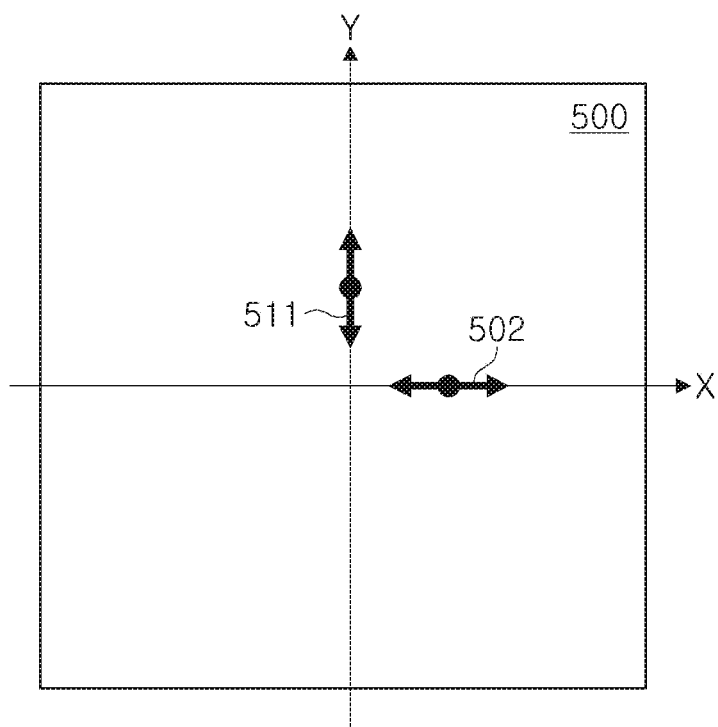

FIG. 11 may be a diagram illustrating polarization components of light passing through a second beam displacer among a pair of beam displacers included in a first lighting polarization element. The second beam displacer of the first illumination polarization element may only separate and move the second polarization component 502 from the light emitted by the illumination unit. Accordingly, as illustrated in FIG. 11, in light passing through the second beam displacer of the first lighting polarization element, the second polarization component 512 may be disposed at the second coordinate C2, rather than the origin of the X-Y plane 500.

Figure 12:
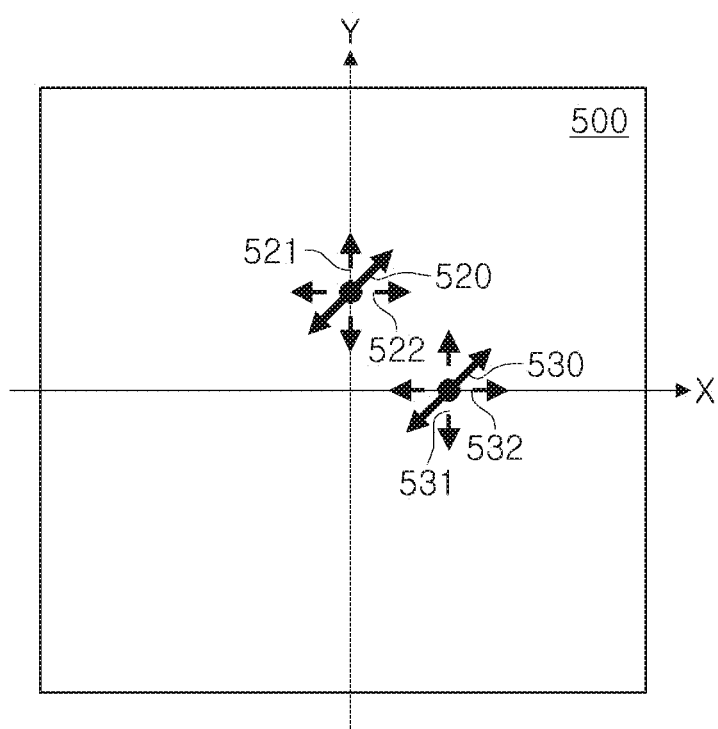

FIG. 12 may be a diagram illustrating light after passing through a wave plate included in an illumination unit. Referring to FIG. 12, the polarization direction of light in the wave plate may be adjusted. For example, a first polarization direction of each of the first polarization component 511 and the second polarization component 512 separated by the first lighting polarization element may be distorted by 45 degrees such that a first light 520 having an optical axis passing through the first coordinate C1 and a second light 530 having an optical axis passing through the second coordinate C2 may be generated.

Light incident to the X-Y plane 500 may be decomposed into polarization components traveling in directions orthogonal to each other, in other words, decomposed into a polarization component traveling in the X-axis direction and a polarization component traveling in the Y-axis direction. Referring to FIG. 12, the first light 520 may be decomposed into a first polarization component 521 traveling in the Y-axis direction and a second polarization component 522 traveling in the X-axis direction. Similarly, the second light 530 may also be decomposed into a first polarization component 531 and a second polarization component 532.

Figure 13:
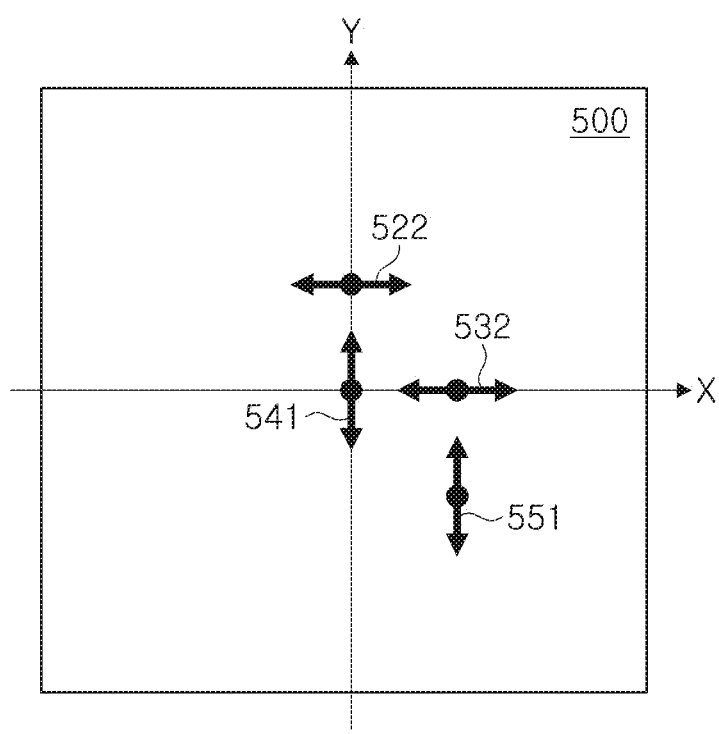

Light passing through the wave plate may be incident to the second polarization element. FIG. 13 may be a diagram illustrating polarization components of light passing through a first beam displacer among a pair of beam displacers included in a second polarization element. Referring to FIG. 13, the first beam displacer of the second polarization element may selectively separate and move only the first polarization components 521 and 531 from each of the first light 520 and the second light 530. Accordingly, as illustrated in FIG. 13, the first polarization component 541 passing through the third coordinate C3, which is the origin, and the first polarization component 551 passing through the fourth coordinate C4 may be generated. Positions of the second polarization components 522 and 532 of the first light 520 and the second light 530 may not be adjusted.

Figure 14:
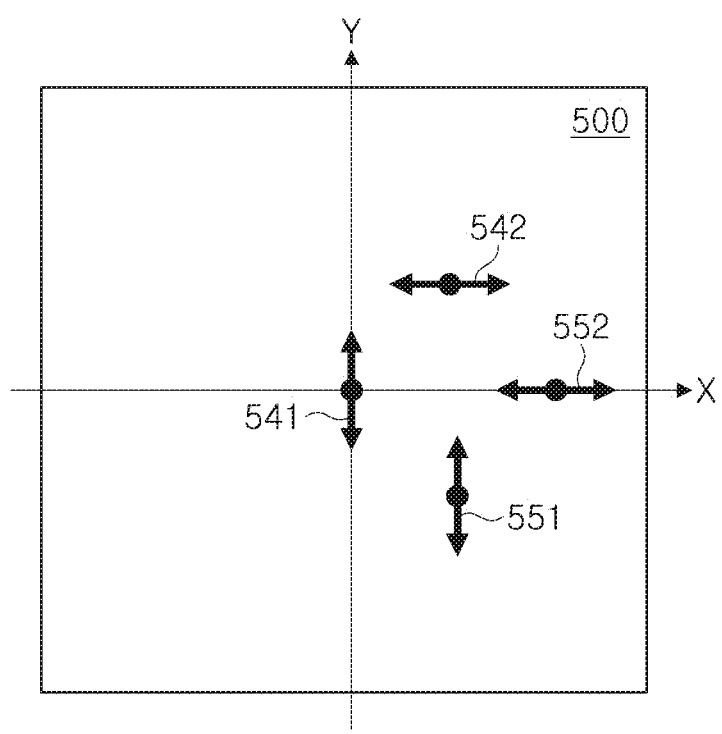

FIG. 14 may be a diagram illustrating polarization components of light passing through the second beam displacer among a pair of beam displacers included in the second polarization element. Differently from the first beam displacer, the second beam displacer may adjust only the position of the second polarization component 522 and 532. For example, as illustrated in FIG. 14, the position of the first polarization component 542 of the first light 520 may be changed to the fifth coordinate C5, and the second polarization component 552 of the second light 530 may be changed to the sixth coordinate C6. Accordingly, as illustrated in FIG. 14, the light emitted from the light source from the illumination unit may be separated into polarization components 541, 542, 551, and 552 corresponding to four paths and may be incident to the sample.

As described above with reference to FIGS. 2 to 4, at least one of the illumination unit and the light receiving unit may include a compensator instead of a polarization element. Accordingly, as described with reference to FIGS. 9 to 14, when the illumination unit includes light polarization elements, the light receiving unit may include a compensator instead of a polarization element. The compensator may change the polarization state of light according to a rotation angle thereof. The control unit of the semiconductor measurement apparatus may rotate the compensator to least four different angles, and the polarization state of each of the polarization components 541, 542, 551, and 552 reflected from the sample may vary depending on the rotation angle of the compensator.

The image sensor of the semiconductor measurement apparatus may output a self-interference image representing the interference between polarization components of light as an original image, and the control unit may obtain at least four original images while rotating the compensator to at least four different angles. In each of the original images, a plurality of regions in which peaks appear due to interference between polarization components may be represented, and the control unit may generate sample images from regions in which peaks appear. The control unit may, by composing elements of the Mueller matrix with sample images, analyze the polarization components of light, and may measure the selected critical dimension and overlay of structures formed in the region in which light is reflected in the sample based on the analysis.

FIGS. 15A to 18B are diagrams illustrating a compensator included in a semiconductor measurement apparatus according to an example embodiment. In the example embodiments described with reference to FIGS. 15A to 18B, it is assumed that the optical axis of light is parallel to the z-axis.

Figure 15A:
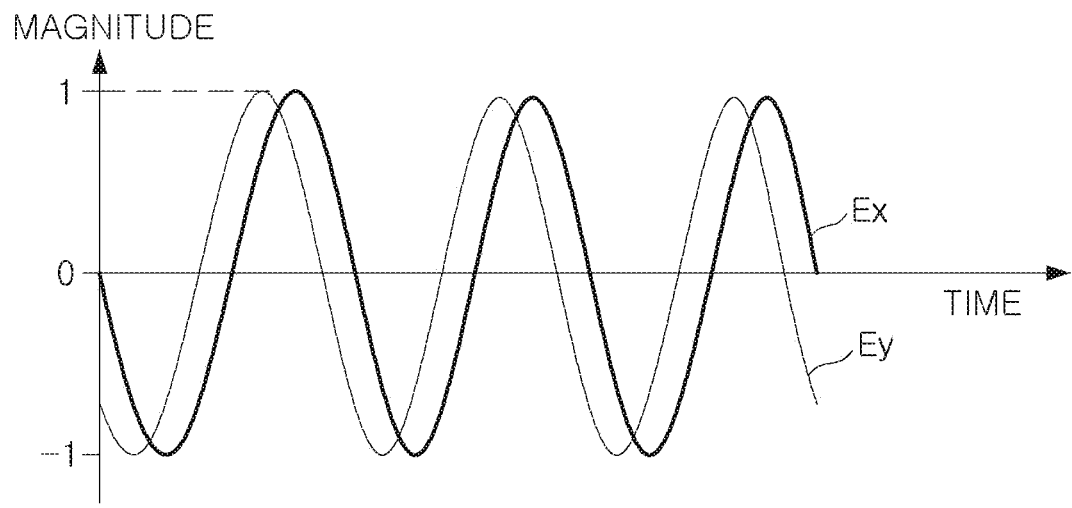
FIGS. 15A to 18B are diagrams illustrating a compensator included in a semiconductor measurement apparatus according to an example embodiment of the present disclosure.
Figure 15B:
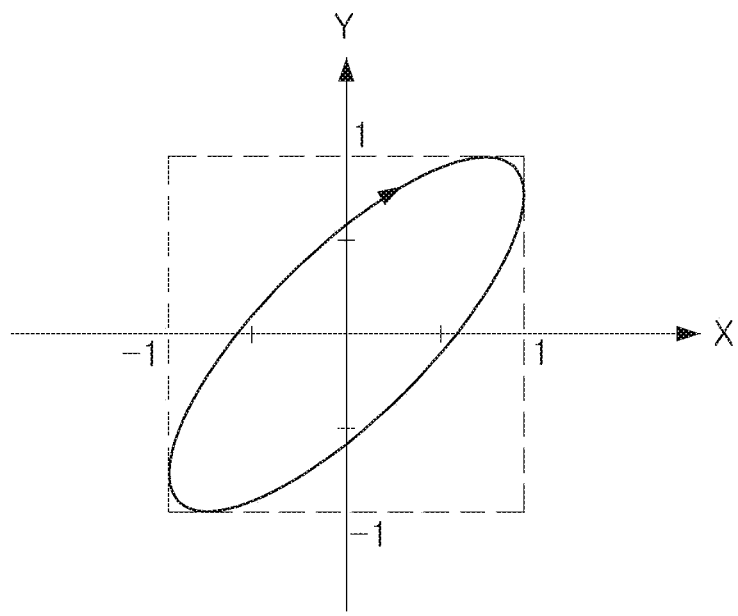

FIGS. 15A and 15B may be graphs illustrating a polarization state of light passing through a compensator when a rotation angle of the compensator is a first angle. FIG. 15A may represent a first polarization component Ex in the x-axis direction and a second polarization component Ey in the y-axis direction included in light passing through the compensator. One of the first polarization component Ex and the second polarization component Ey may be a P polarization component, and the other thereof may be an S polarization component. The first polarization component Ex and the second polarization component Ey have a desired and/or alternatively predetermined first phase difference, and due to the first phase difference, the polarization state of light on the X-Y plane may have an elliptical shape as illustrated in FIG. 15B. As illustrated in FIG. 15A, the first phase difference may be $-\pi/4$.

Figure 16A:
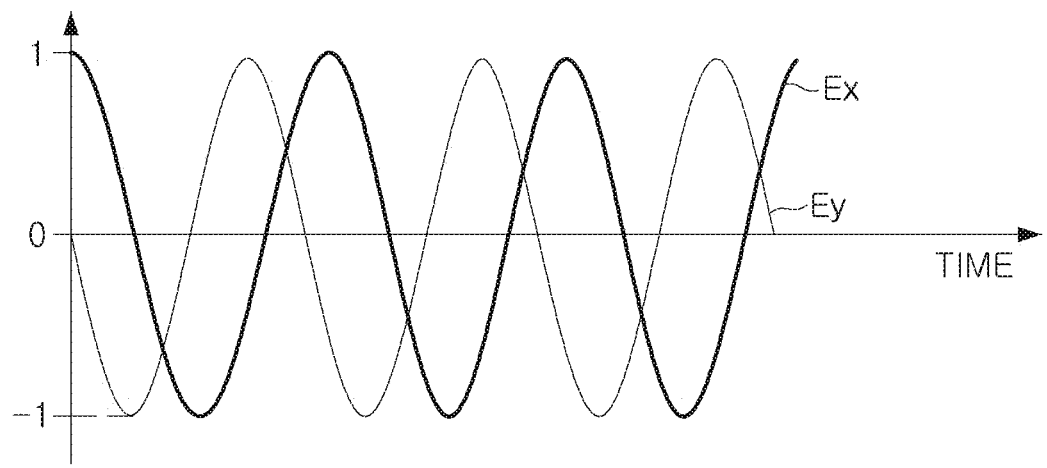
Figure 16B:
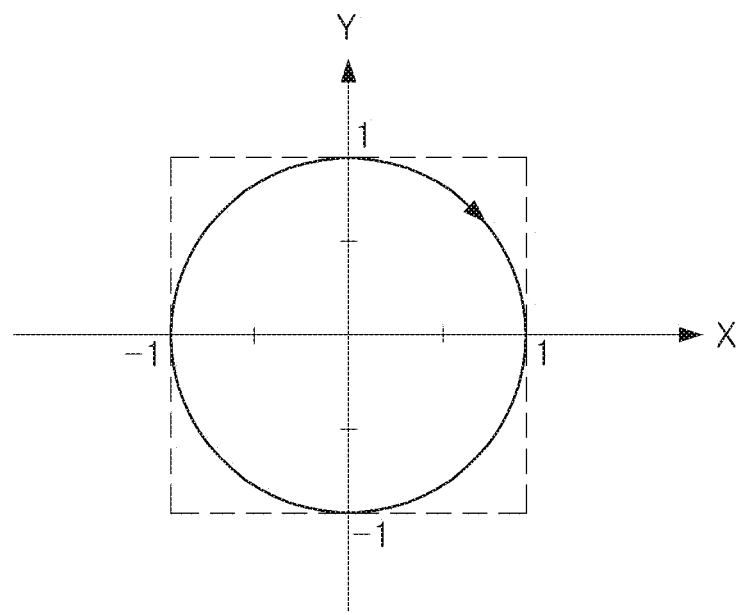

FIGS. 16A and 16B may be graphs illustrating a polarization state of light passing through a compensator when a rotation angle of the compensator is a second angle different from the first angle. As illustrated in the FIG. 16A, as the rotation angle of the compensator is adjusted to the second angle, the phase difference between the first polarization component Ex and the second polarization component Ey may appear as a second phase difference different from the first phase difference. For example, in the example embodiment illustrated in FIGS. 16A and 16B, the second phase difference may be $-\pi/2$. Also, when the rotation angle of the compensator is the second angle, the polarization state of light passing through the compensator may have a circular shape rotating clockwise.

Figure 17A:
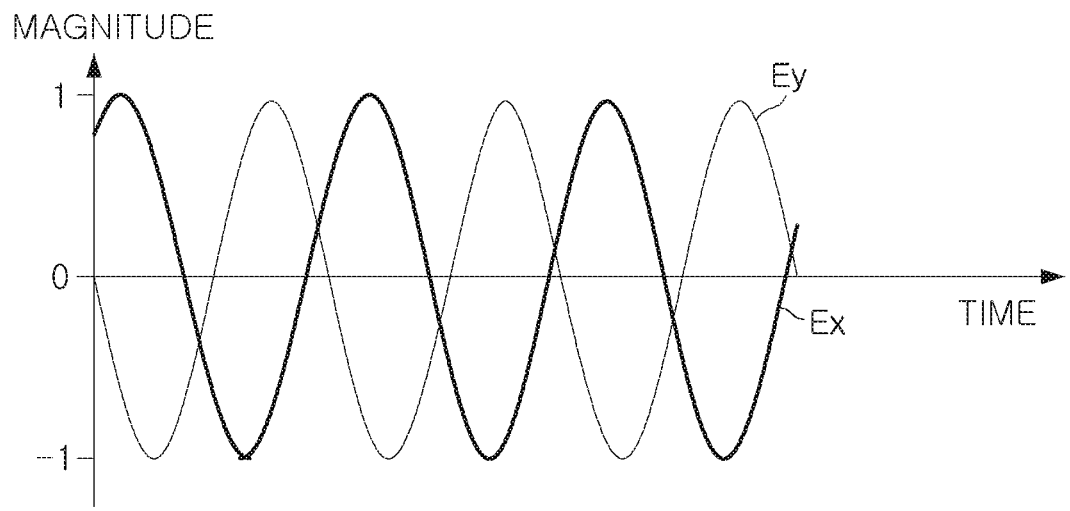
Figure 17B:
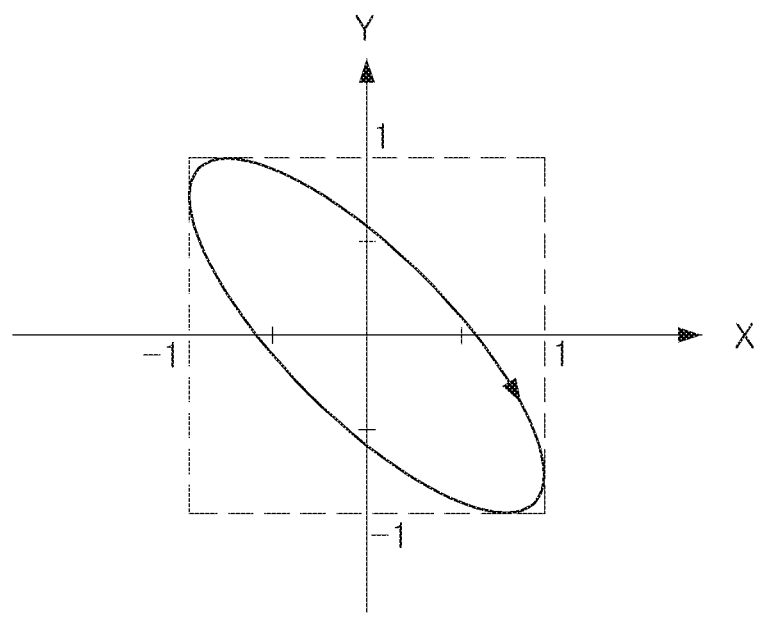

FIGS. 17A and 17B may illustrate graphs illustrating the polarization state of light passing through the compensator when the rotation angle of the compensator is a third angle different from the first and second angles. Referring to FIG. 17A, when the rotation angle of the compensator is a third angle, the phase difference between the first polarization component Ex and the second polarization component Ey may be a third phase difference, and the third phase difference may be $-3\pi/4$. Also, the polarization state of light passing through the compensator may have an elliptical shape on the X-Y plane, as illustrated in FIG. 17B.

Figure 18A:
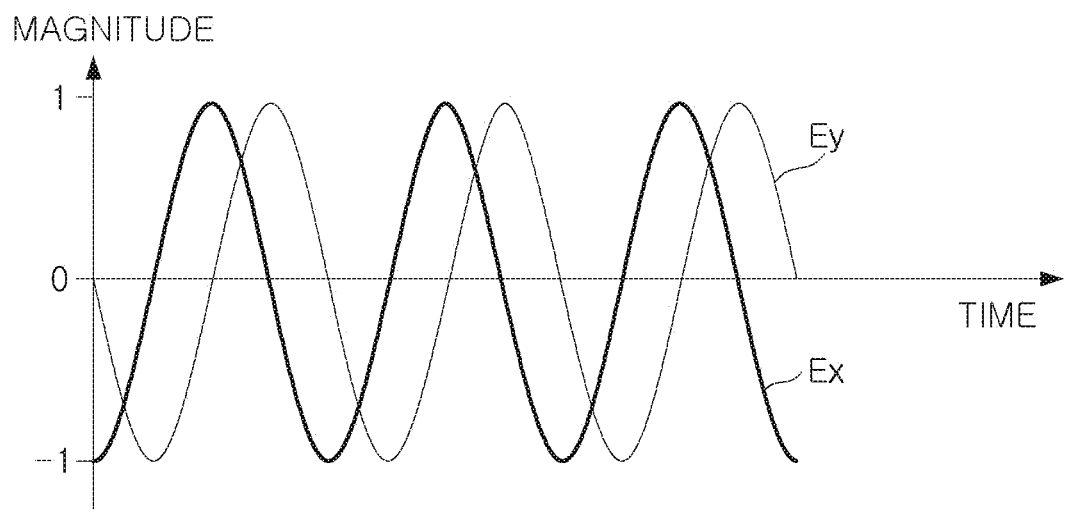
Figure 18B:
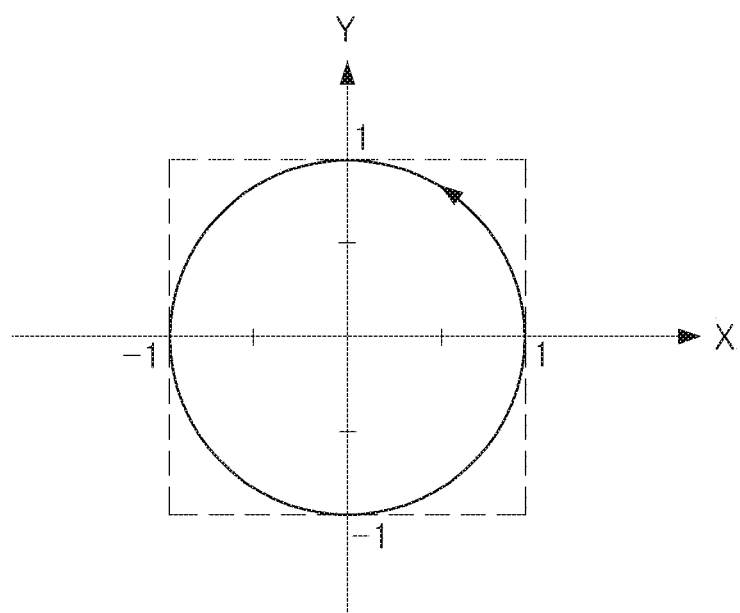
Figure 19A:
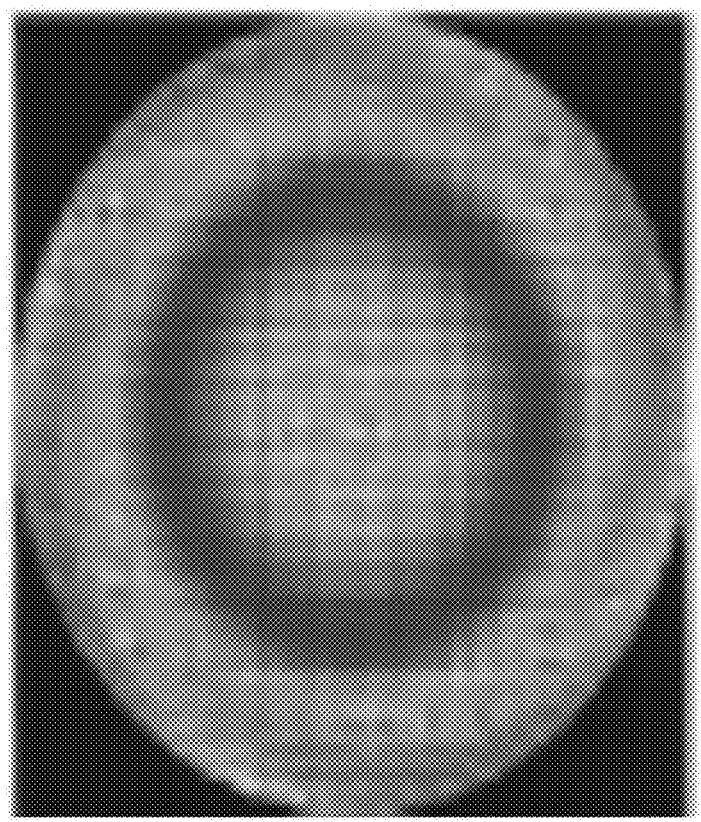
FIGS. 19A to 19D are diagrams illustrating original images generated by a semiconductor measurement apparatus according to an example embodiment of the present disclosure.
Figure 19B:
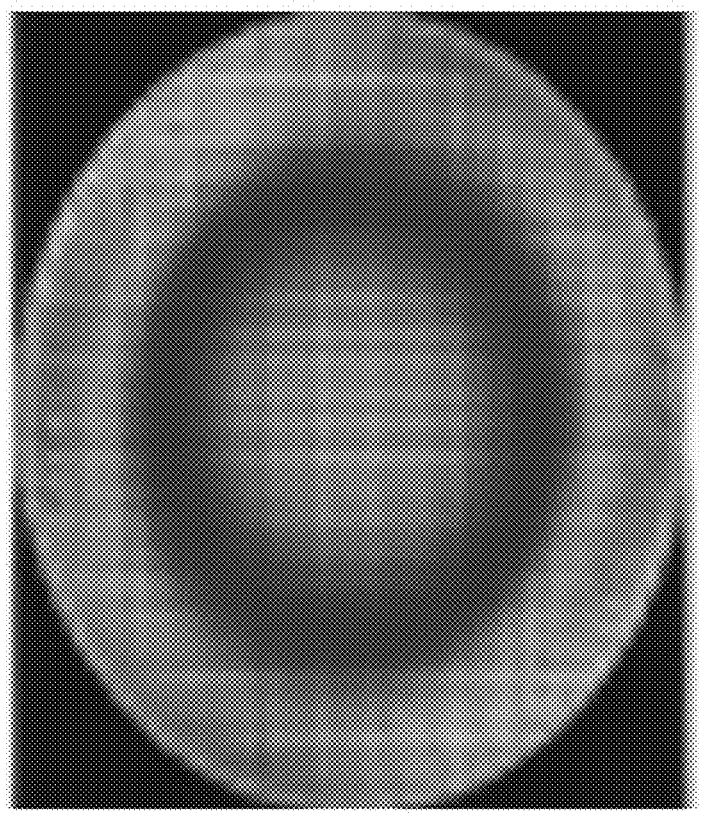
Figure 19C:
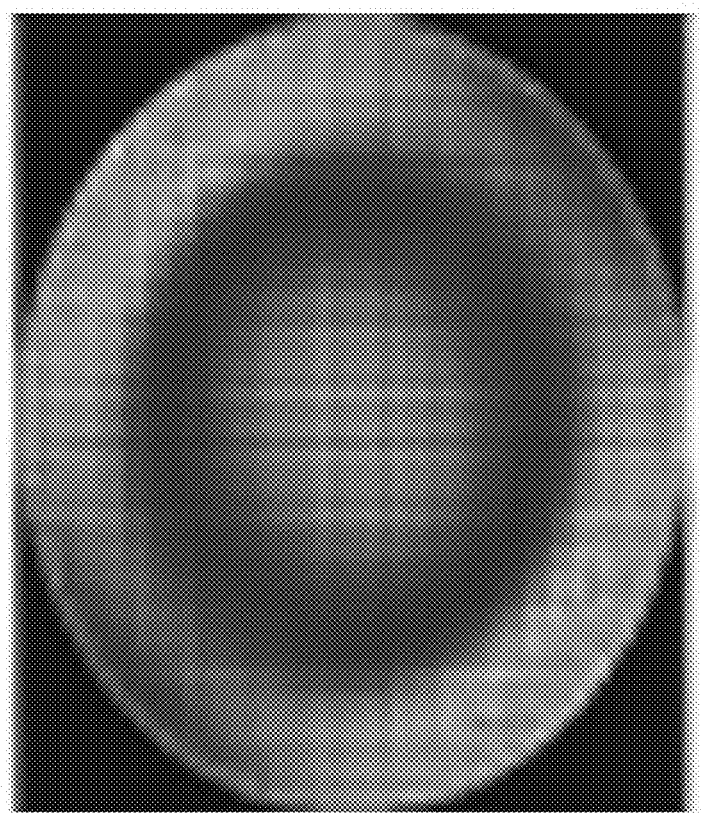
Figure 19D:
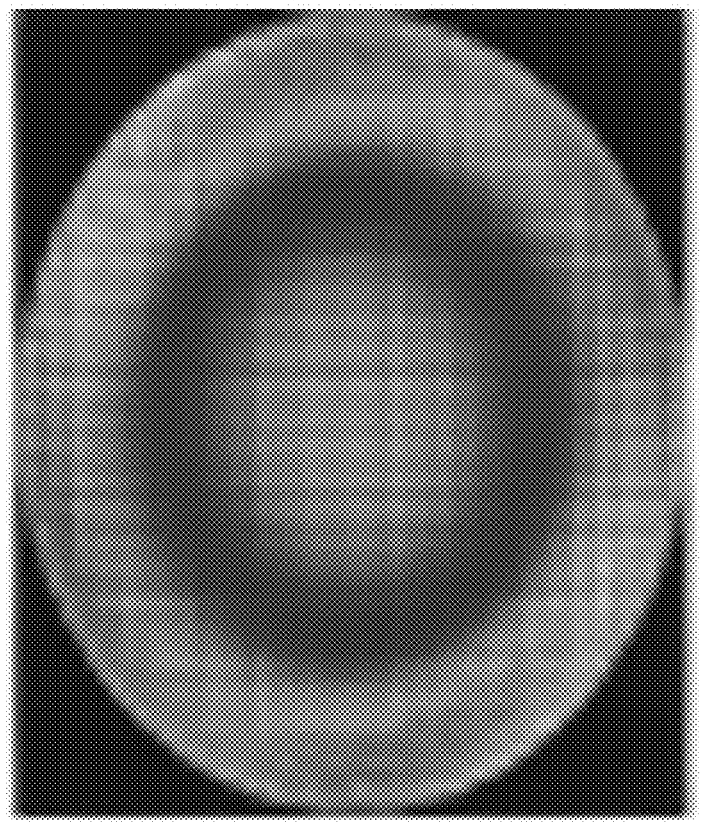
Figure 20A:
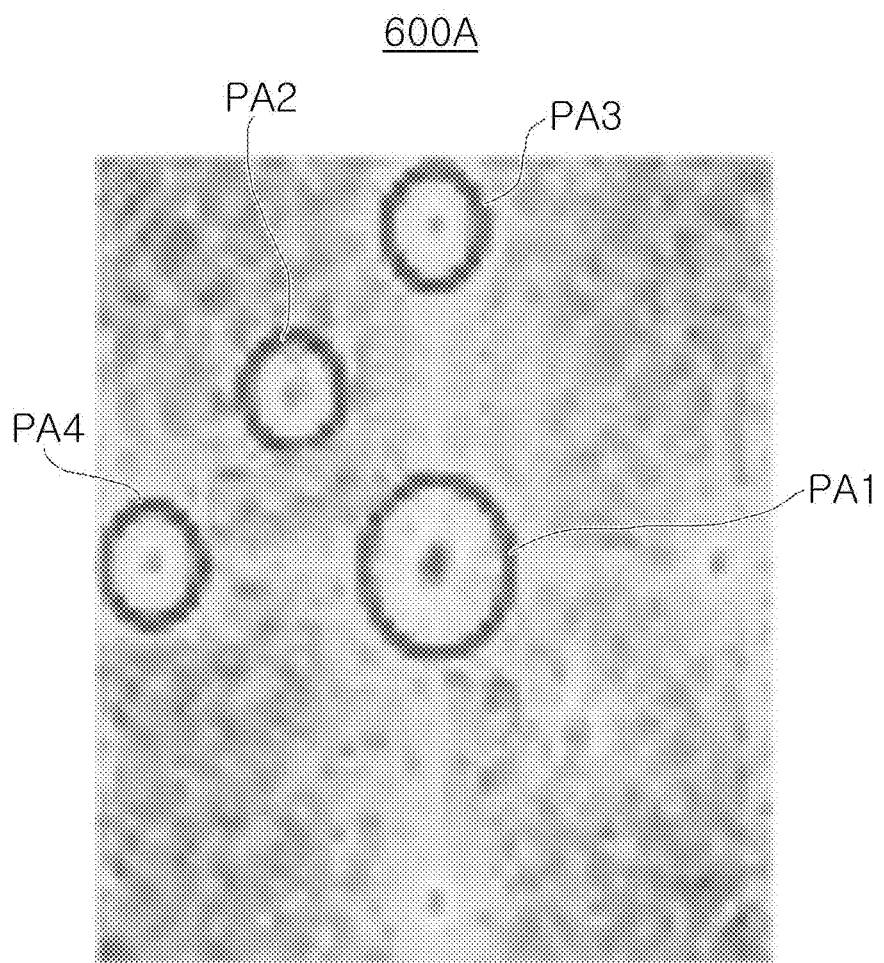
FIGS. 20A to 20D are diagrams illustrating frequency-conversion images obtained from an original image by a semiconductor measurement apparatus according to an example embodiment of the present disclosure.
Figure 20B:
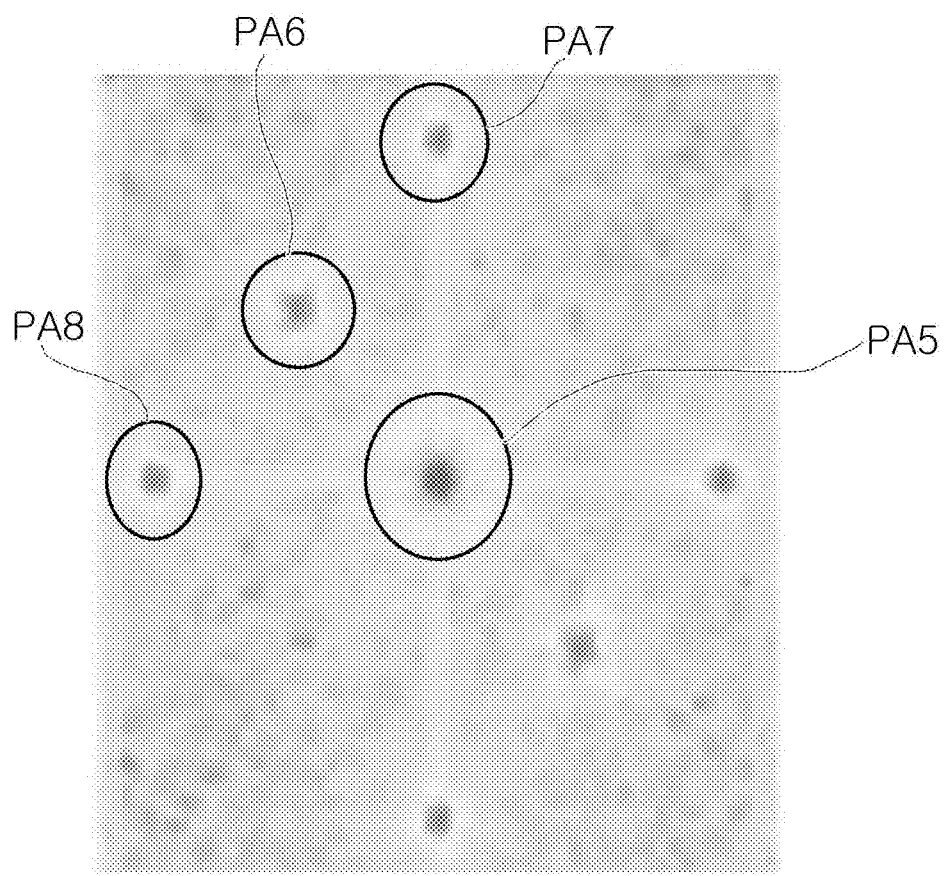
Figure 20C:
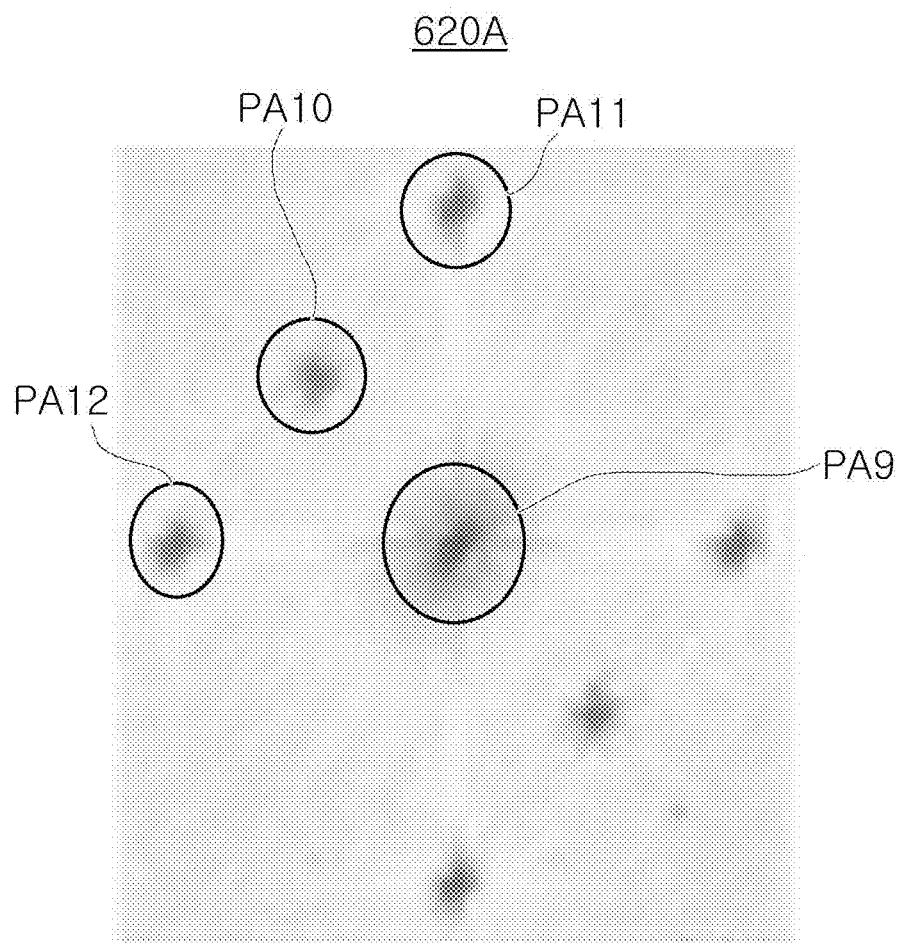
Figure 20D:
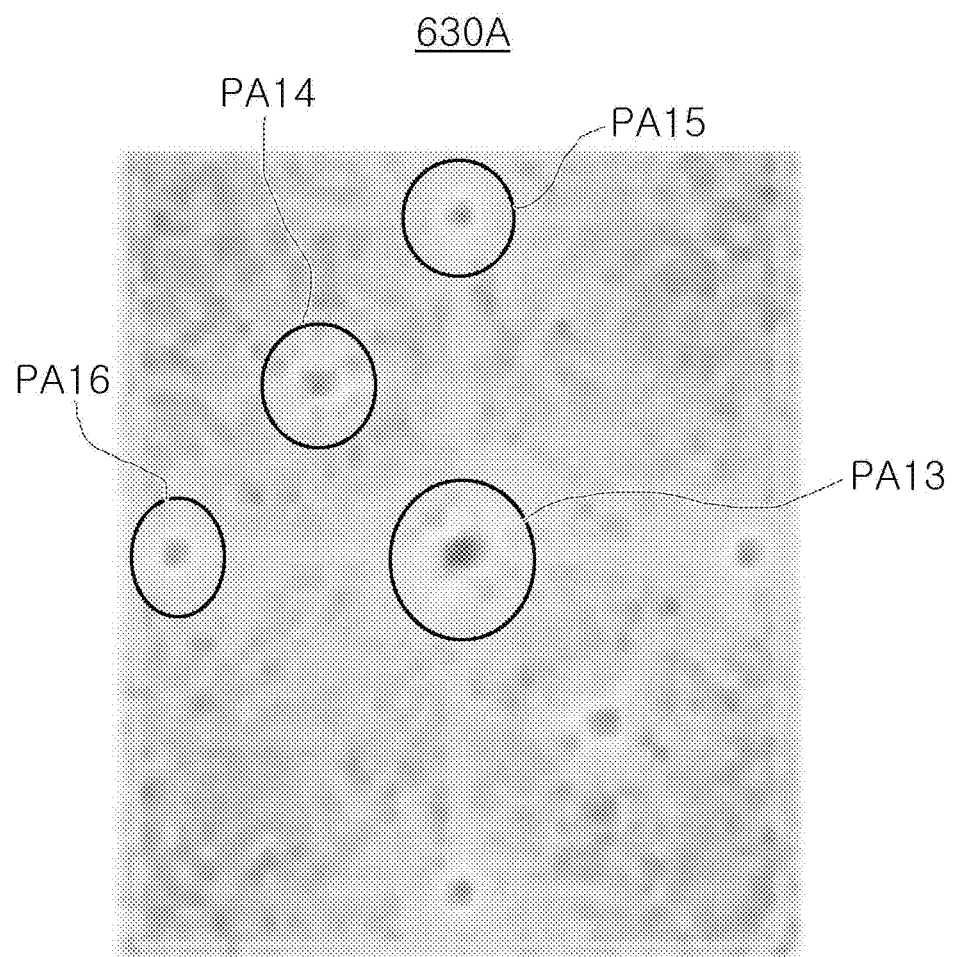

FIG. 18A and FIG. 18B may be a diagram illustrating a polarization state of light passing through the compensator when the rotation angle of the compensator is a fourth angle different from the first to third angles. As illustrated in the FIG. 18A, when the rotation angle of the compensator is adjusted to the fourth angle, the fourth phase difference between the first polarization component Ex and the second polarization component Ey may appears as $\pi/2$. Also, as illustrated in FIG. 18B, the polarization state of light passing through the compensator may have a circular shape rotating counterclockwise.

As described with reference to FIGS. 15A to 18B, the polarization state of light passing through the compensator may vary according to the rotation angle of the compensator. The control unit may adjust the rotation angle of the compensator to at least four different angles, and while the compensator is determined to be each rotation angle, the control unit may obtain a plurality of sample images using an original image output by the image sensor. In an example embodiment, by obtaining a plurality of sample images for each rotation angle of the compensator, the control unit may secure a sufficient number of sample images necessary to configure the elements of the Mueller matrix.

FIGS. 19A to 19D are diagrams illustrating original images generated by a semiconductor measurement apparatus according to an example embodiment. FIGS. 20A to 20D are diagrams illustrating frequency-conversion images obtained from an original image by a semiconductor measurement apparatus according to an example embodiment.

FIGS. 19A to 19D may be diagrams illustrating examples of original images 600 to 630 generated by an image sensor included in a semiconductor measurement apparatus. As described above, each of the original images 600 to 630 generated by the image sensor may be a multiple interference image. At least one of the illumination unit irradiating light to the sample and the optical unit transmitting light reflected from the sample to the image sensor may include a compensator. For example, both the illumination unit and the optical unit may include a compensator, or one of the illumination unit and the optical unit may include a compensator and the other thereof may include polarization elements such as a beam displacer. Hereinafter, for ease of description, the example in which a compensator is included in one of the illumination unit and the optical unit and polarization elements are included in the other thereof will be described.

Accordingly, as described above with reference to FIGS. 9 to 14, light passing through the polarization elements may be decomposed into a plurality of polarization components traveling at different positions on a plane parallel to the light-receiving surface of the image sensor. Also, as described with reference to FIGS. 15A to 18B, light passing through the compensator may have a polarization state determined according to a rotation angle of the compensator. Accordingly, light output by the illumination unit, reflected from the sample, and incident to the image sensor through the optics may have a plurality of polarization components interfering with each other, and the interference pattern of the plurality of polarization components may vary depending on the rotation angle of the compensator.

The original images 600 to 630 illustrated in FIGS. 19A to 19D may be self-interference images received from the image sensor while the control unit adjusts the rotation angle of the compensator to the first to fourth angles. Due to the difference in the rotation angle of the compensator, interference patterns of polarization components may appear different from each other in the original images 600 to 630 as illustrated in FIGS. 19A to 19D.

In an example embodiment, the control unit may obtain the original images 600-630 while adjusting the rotation angle of the compensator by 45 degrees. For example, the first original image 600 may be an image output by the image sensor when the rotation angle of the compensator is $-\pi/4$, and the second original image 610 may be an image output by an image sensor when the rotation angle of the compensator is $-\pi/2$. The third original image 620 may be an image output by the image sensor when the rotation angle of the compensator is $-3\pi/4$, and the fourth original image 630 may be an image output by the image sensor when the rotation angle of the compensator is $\pi/2$.

The frequency-conversion images 600A-630A illustrated in FIGS. 20A to 20D may be matched with the original images 600 to 630 illustrated in FIGS. 19A to 19D, respectively. In other words, the first frequency-conversion image 600A may be obtained by converting the first original image 600 into the frequency domain, and the second frequency-conversion image 610A may be obtained by converting the second original image 610 into the frequency domain. The third frequency-conversion image 620A may be obtained by converting the third original image 630 into the frequency domain, and the fourth frequency-conversion image 630A may be obtained by converting the fourth original image 630 into the frequency domain. For example, the control unit of the semiconductor measurement apparatus may generate frequency-conversion images 600A-630A by Fourier transforming each of the original images 600-630.

Referring to FIGS. 20A to 20D, each of the frequency-conversion images 600A-630A may include regions in which peaks appear due to interference between polarization components. Referring to FIGS. 20A to 20D, regions in which peaks appear may be distributed symmetrically by 180 degrees with respect to the origin, which is the center of each of the frequency-conversion images 600A-630A.

The control unit may select regions in which peaks appear due to interference between polarization components in a non-repetitive manner. For example, the control unit may select a plurality of regions as illustrated in FIGS. 20A to 20D such that regions distributed in a 180-degree symmetrical form based on the origin may not be repeatedly selected. In each of the selected regions determined by the control unit, at least two of the polarization elements included in the semiconductor measurement apparatus and the polarization components generated by the compensator may interfere with each other, such that a peak may appear.

For example, the control unit may select four regions among regions in which peaks appear due to interference between polarization components in each of the frequency-conversion images 600A-630A. The regions selected by the control unit may be disposed at the same coordinates in each of the frequency-conversion images 600A-630A.

When the regions in which peaks appear due to interference between polarization components are selected in each of the frequency-conversion images 600A-630A, the control unit may separate the selected regions and may perform frequency inverse conversion, thereby generating a plurality of sample images. Hereinafter, an operation of generating a plurality of sample images will be described in greater detail with reference to FIG. 21.

Figure 21:
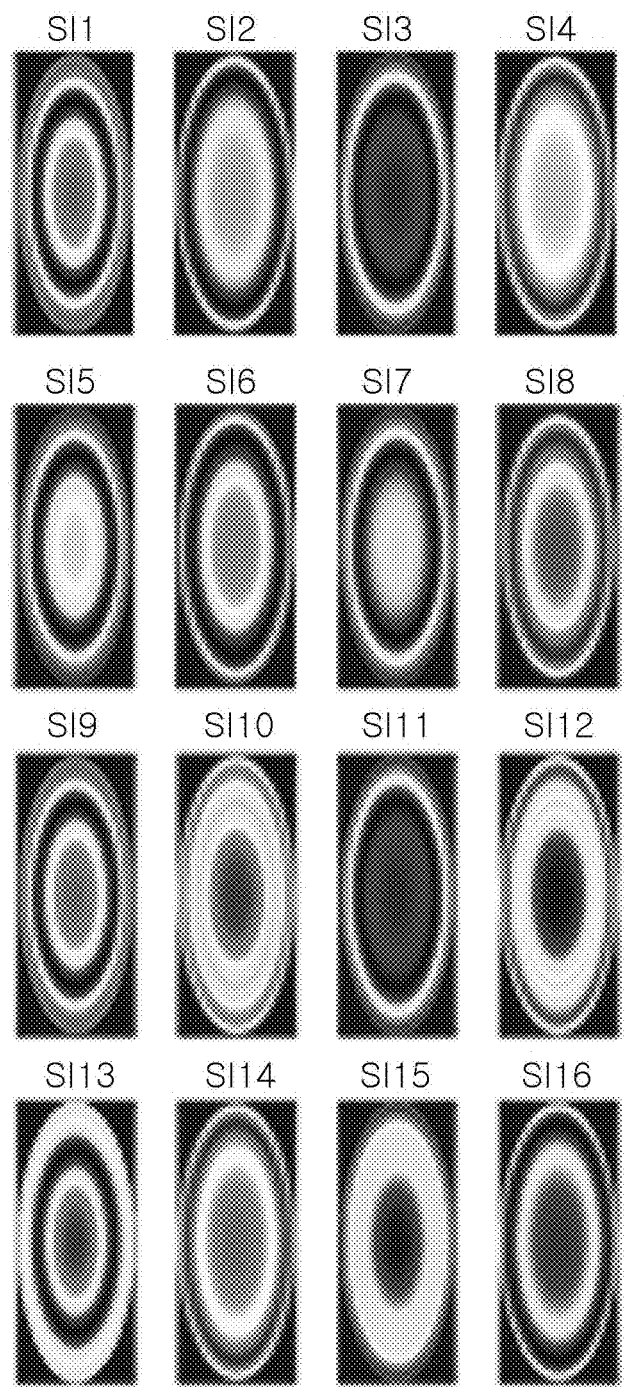
FIG. 21 is a diagram illustrating a plurality of sample images obtained from a frequency-conversion image by a semiconductor measurement apparatus according to an example embodiment of the present disclosure.

FIG. 21 is a diagram illustrating a plurality of sample images obtained from a frequency-conversion image by a semiconductor measurement apparatus according to an example embodiment.

The control unit may obtain a plurality of sample images SI1-SI16 as illustrated in FIG. 21 by operations such as filtering selected regions from each of the frequency-conversion images and disposing the coordinates where the peak appears in the center. For example, the control unit may obtain a plurality of sample images SI1-SI16 as illustrated in FIG. 21 by inversely frequency-converting an image including regions selected from each of the frequency-conversion images.

The first to fourth sample images SI1 to SI4 may be generated by performing inverse frequency-conversion on regions selected from the first frequency-conversion image 600A. Meanwhile, the fifth to eighth sample images SI5-SI8 may be generated by inversely frequency-converting regions selected in the second frequency-conversion image 610A, and the ninth to twelfth sample images SI9-SI12 may be generated by inversely frequency-converting regions selected from the frequency-conversion image 620A. The thirteenth to sixteenth sample images SI13 to SI16 may be generated by inversely frequency-converting regions selected from the fourth frequency-conversion image 630A.

Each of the plurality of sample images SI1 to SI16 may represent an interference pattern of polarization components. In other words, each of the plurality of sample images SI1-SI16 may represent states of at least a portion of the polarization components decomposed by the compensator and the polarization element included in the illumination optical system and the light-receiving optical system, interfering with each other, and incident to the image sensor.

As described above, in an example embodiment, in addition to the intensity difference and phase difference between the P polarization component and the S polarization component included in light, a plurality of sample images SI1-SI16 representing states of at least a portion of polarization components decomposed to travel in a plurality of different positions by the polarization element may be obtained. Accordingly, differently from the method using only the intensity difference and phase difference between the P polarization component and the S polarization component, the critical dimension of the structure may be determined using the states of the polarization components traveling separately from each other in various positions and incident to the image sensor. Accordingly, the number of measurement parameters available for measuring the critical dimension may be increased, and accuracy of measuring the critical dimension may be improved.

Also, in an example embodiment, by including a compensator instead of a polarization element in at least one of the illumination optical system and the light-receiving optical system, measurement stability of a semiconductor measurement apparatus may be improved. Using a compensator which may change the polarization state of light by adjusting the rotation angle instead of a polarization element which may be difficult to interfere with the polarization components of light in an exact position, measurement stability of the semiconductor measurement apparatus may be improved.

To increase the number of measurement parameters available for measuring the critical dimension, a Mueller matrix may be used in an example embodiment. For example, a plurality of elements included in a Mueller matrix may be determined using a plurality of sample images SI1-SI16, and a critical dimension to be measured may be determined by comparing at least a portion of the plurality of elements with reference data stored in the library data.

Figure 22:
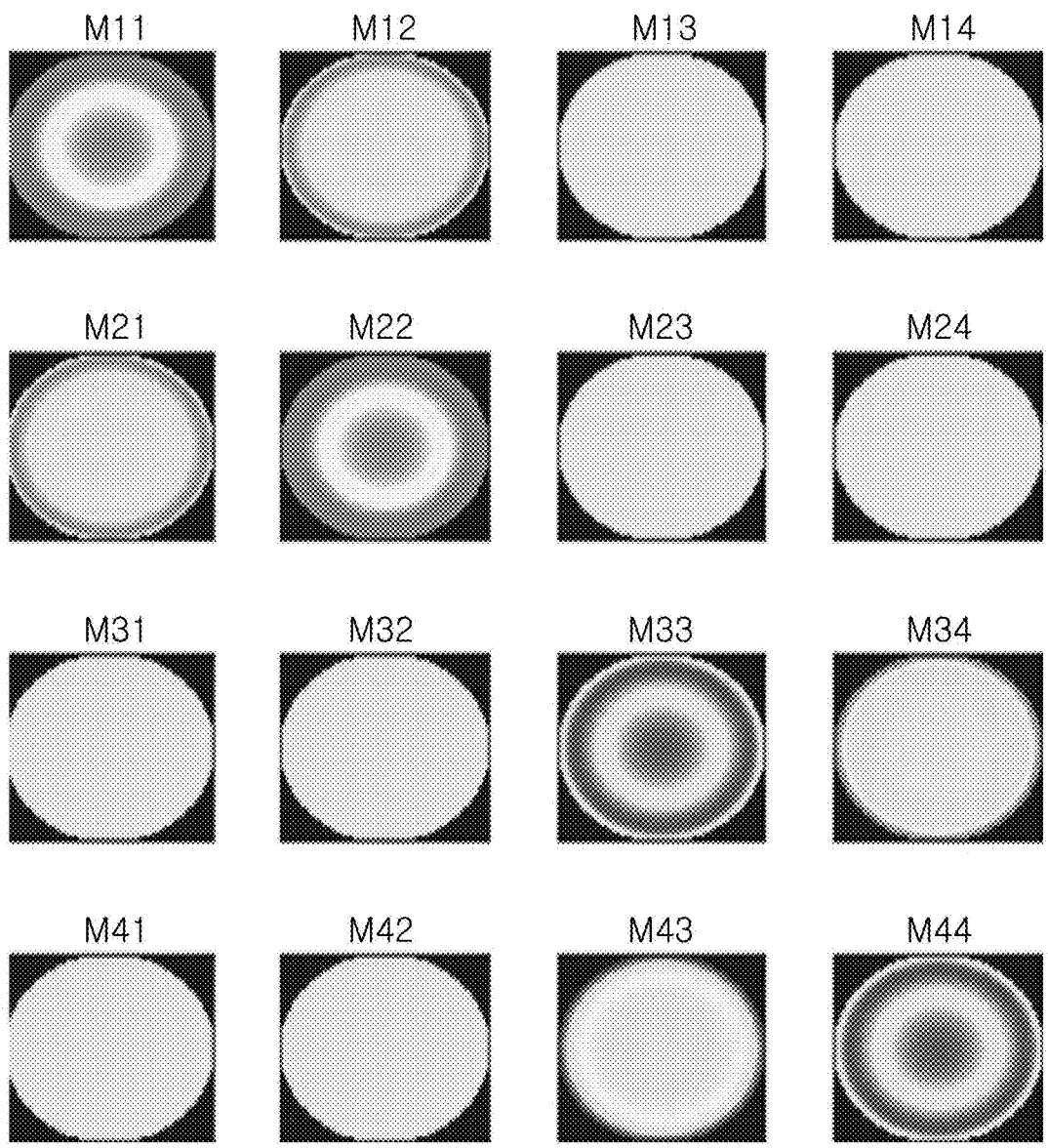
FIGS. 22 and 23 are diagrams illustrating elements of a Mueller matrix obtained by a semiconductor measurement apparatus according to an example embodiment of the present disclosure.
Figure 23:
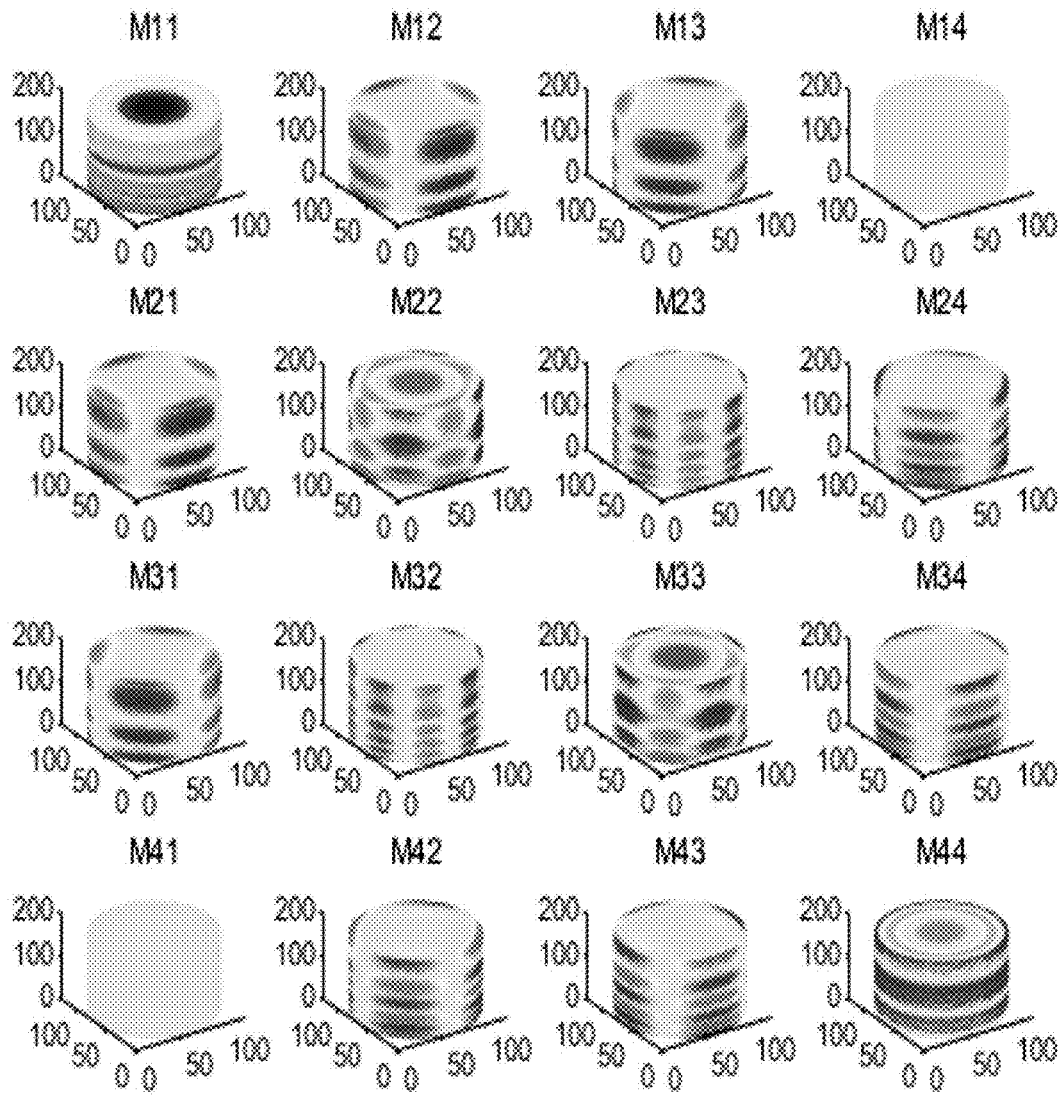

FIGS. 22 and 23 are diagrams illustrating elements of a Mueller matrix obtained by a semiconductor measurement apparatus according to an example embodiment.

As described above, the Mueller matrix is a matrix for handling a Stokes vector representing polarization components of light, and the Mueller matrix may include 16 elements M11-M44. As described above, the control unit may select four regions in which peaks appear from each of the frequency-conversion images 600A-630A obtained by frequency-converting the original images 600-630. Accordingly, the control unit may obtain 16 sample images SI1-SI16 from the original images 600-630, and may determine the elements M11-M44 included in the Mueller matrix using the sample images SI1-SI16.

For example, each of the plurality of sample images SI1-SI16 representing the interference between at least a portion of the polarization components of light reflected from the sample may be defined as a polynomial including at least one of the elements included in the Mueller matrix. Accordingly, the elements M11-M44 of the Mueller matrix may be determined using the plurality of sample images SI1 to SI16 conversely.

The Mueller matrix may be for handling the Stokes vector, and using the Stokes vector, other measurement parameters such as degree of polarization may be obtained in addition to the intensity difference and phase difference of polarization components. Accordingly, various measurement parameters representing the characteristics of polarization components may be calculated using the plurality of elements M11-M44, and the selected critical dimension may be accurately determined using the parameters.

Alternatively, the control unit of the semiconductor measurement apparatus may select at least one of the plurality of elements M11-M44 and may compare at least one selected element with reference data included in the library data, thereby determining the selected critical dimension. In this case, the control unit may compare at least one element, which is image format data, with reference data, which is also image format data. In the library data, reference data represented as different images may be stored depending on the value of the selected critical dimension, and the control unit may determine the selected critical dimension by referring to reference data most similar to the at least one selected element.

Also, the control unit may select at least one element and may determine the selected critical dimension using spectrum data representing a distribution in which pixel values of specific coordinates in the at least one element vary according to a wavelength band. For example, while an illumination unit of a semiconductor measurement apparatus radiates light of a plurality of wavelength bands, an image sensor in each wavelength band may generate an original image. Accordingly, the control unit may obtain 3D data in which original images are disposed according to wavelength bands.

The control unit may obtain a plurality of elements M11-M44 included in the Mueller matrix by processing an original image corresponding to each wavelength band. As illustrated in FIG. 23, each of the plurality of elements M11-M44 may have a 3D data format disposed according to a wavelength band.

In the example embodiment illustrated in FIG. 23, the control unit may select at least one element to determine a selected critical dimension, and may obtain spectrum data representing a distribution of the selected element according to a wavelength band. The control unit may determine the selected critical dimension by comparing the spectral data with the reference data stored in the library data. For example, by comparing the value of the element selected in the wavelength band having the highest sensitivity for the selected critical dimension with the reference data, a selected critical dimension may be determined. In an example embodiment, the control unit may obtain a distribution of specific pixel values according to a wavelength band in the selected element as spectrum data.

Figure 24:
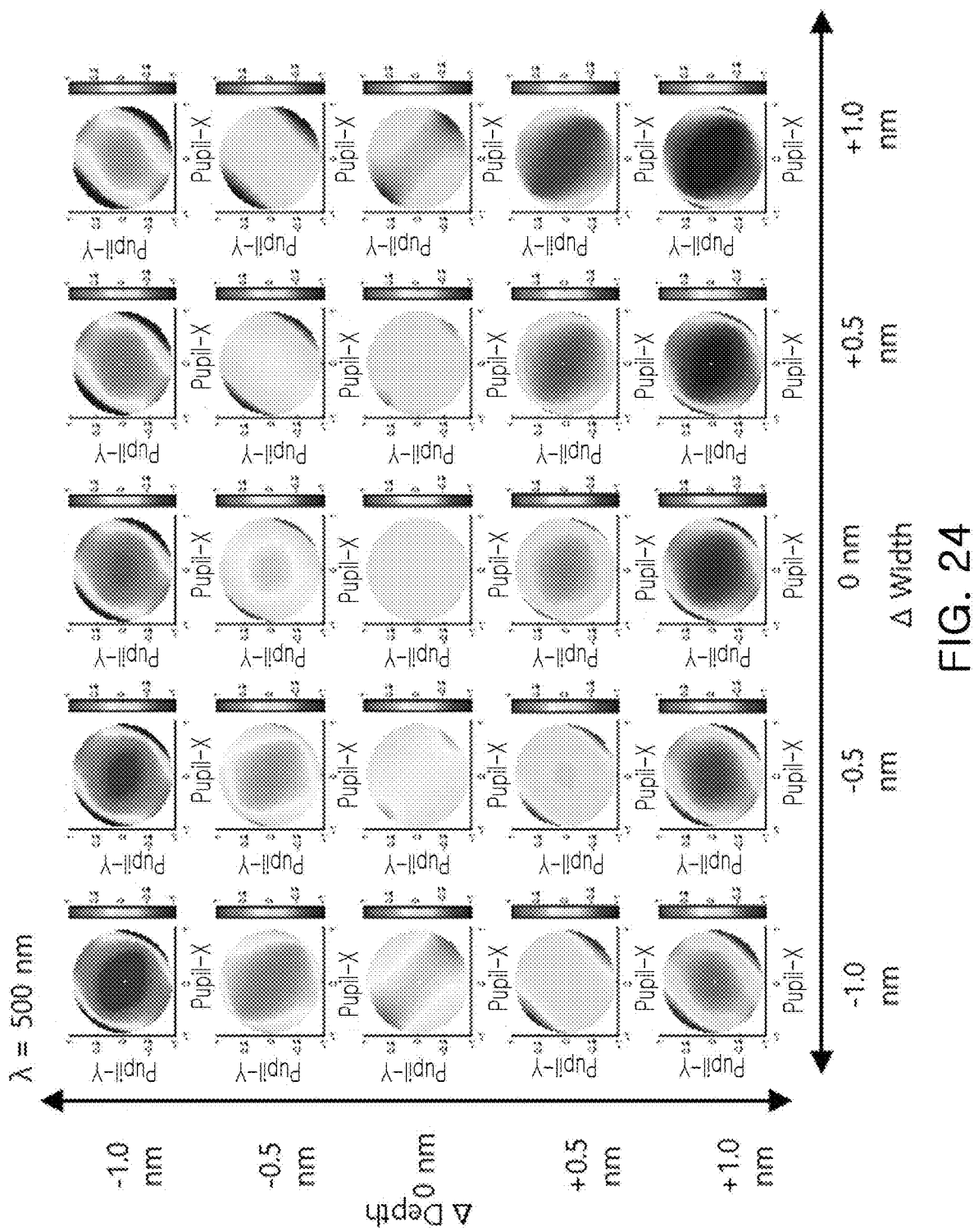
FIGS. 24 and 25 are diagrams illustrating a method of operating a semiconductor measurement apparatus according to an example embodiment of the present disclosure.
Figure 25:
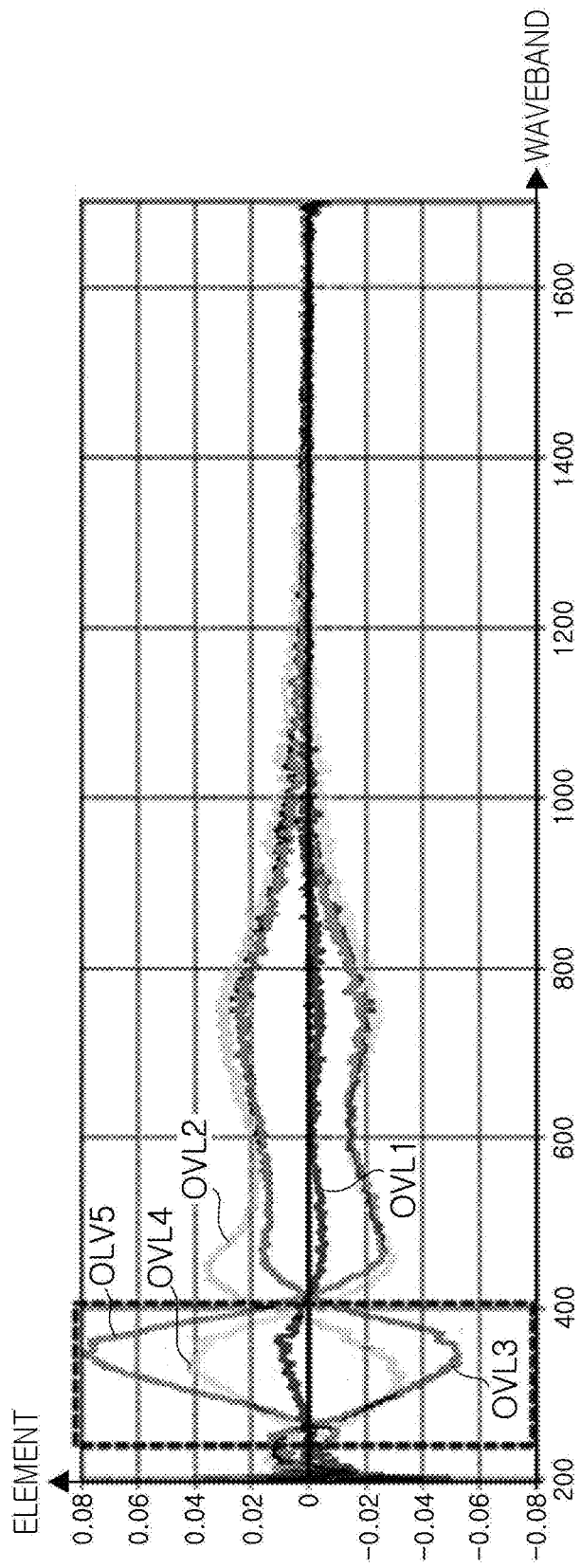

FIGS. 24 and 25 are diagrams illustrating a method of operating a semiconductor measurement apparatus according to an example embodiment.

FIG. 24 may be a diagram illustrating interaction between a width and a height of specific structures formed in a sample. A horizontal axis in FIG. 24 may represent a difference in widths between structures formed in the sample, and a vertical axis in FIG. 24 may represent a difference in heights between structures formed in the sample. In the example embodiment illustrated in FIG. 24, structures formed on the sample may be fin structures providing a channel region of a transistor, and a wavelength band of light irradiated to the sample may be fixed to a specific wavelength band.

Referring to FIG. 24, a width difference and a height difference of fin structures may be distinguished in units of 0.5 nm using elements of a Mueller matrix. Accordingly, even when there is interaction between different critical dimensions representing the structure of the structures included in the sample, the selected critical dimension to be measured may be accurately determined.

The graph illustrated in FIG. 25 may illustrate the distribution of at least one element selected from the Mueller matrix according to the wavelength band. As an example, the graph illustrated in FIG. 25 may be a graph representing the sum of M23 and M32 among the elements of the Mueller matrix in the form of spectral data according to wavelength bands. Referring to FIG. 25, in each of the five embodiments OVL1-OVL5 having different overlay characteristics, spectrum data may appear to have different distributions, which may be due to an overlay difference in each of the five embodiments OVL1-OVL5.

For example, in the example embodiment illustrated in FIG. 25, the first embodiment OVL1 may correspond to a state in which structures included in each of a plurality of layers stacked on each other are relatively accurately aligned without offset. In other words, the first embodiment OVL1 may correspond to the example embodiment illustrated in FIG. 22A among the example embodiments described with reference to FIGS. 22A to 22C.

Meanwhile, the second and third embodiments OVL2 and OVL3 may correspond to a state in which structures included in each of a plurality of layers stacked on each other are offset in a desired and/or alternatively predetermined first direction. The fourth and fifth embodiments OVL4 and OVL5 may correspond to a state in which the stacked structures are offset in a second direction opposite to the first direction.

Referring to FIG. 25, it may be difficult to distinguish the first to fifth embodiments OVL1-OVL5 from each other using spectrum data of a specific wavelength band. For example, when the elements of the Mueller matrix are determined from an original image obtained by irradiating a sample with light in a wavelength band of 1000 nm or more, as illustrated in FIG. 25, the first to fifth embodiments OVL1 to OVL5 having different overlay characteristics may not be distinguished based on the spectrum data.

Also, it may be difficult to distinguish example embodiments in a specific wavelength band. For example, assuming that a sample is irradiated with light in a wavelength band of 400 nm or more and 1000 nm or less, the second embodiment OVL2 and the third embodiment OVL3 may not be distinguished from each other only with the spectrum data, or the fourth embodiment OVL4 and the fifth embodiment OVL5 may not be distinguished from each other.

The entirety of the first to fifth embodiments OVL1-OVL5 may be distinguished using elements of a Mueller matrix obtained by irradiating a sample with light in a wavelength band of around 300 nm. Referring to FIG. 23, the sum of M23 and M32 obtained by irradiating a sample with light in a wavelength band of around 300 nm may have a very large difference depending on overlay characteristics of structures included in the sample. Accordingly, a wavelength band around 300 nm may be defined as a wavelength band at which relatively high sensitivity to the overlay characteristics of the sample is obtained. The control unit of the semiconductor measurement apparatus may determine the elements of the Mueller matrix from the original image obtained while irradiating the sample with light in the wavelength band around 300 nm, and the control unit may determine the overlay state of the structures formed in the region from which light is reflected in the sample by referring to the sum of a portion of elements selected from among the elements, for example, M23 and M32.

The method of operating of the semiconductor measurement apparatus described with reference to FIG. 25 is not limited to the determination of overlay. For example, a distribution according to a wavelength band of at least one element among a plurality of elements included in the Mueller matrix may have high sensitivity in a specific wavelength band with respect to a selected critical dimension among critical dimensions of a structure formed in a sample. When the selected critical dimension to be measured in the structure is determined, the control unit of the semiconductor measurement apparatus may, by selecting at least one element having the highest sensitivity to the selected critical dimension in the Mueller matrix, and selecting the wavelength band in which the selected element has the highest sensitivity to the selected critical dimension, may irradiate light of the selected wavelength band to the sample. Accordingly, the selected critical dimension may be swiftly and accurately determined.

Also, when each of the elements does not have high sensitivity to the selected critical dimension, the selected critical dimension may be determined using the sum of two or more elements as illustrated in FIG. 25. In an example embodiment, in addition to the intensity difference and phase difference of polarization components, using various measurement parameters which may represent the characteristics of the polarization components of light, such as the degree of polarization and the elements included in the Mueller matrix, each of the various critical dimensions representing the shape and structure of structures may be accurately determined despite interaction between the critical dimensions.

According to the aforementioned example embodiments, by polarizing light incident to the sample and light reflected from the sample, an original image in which multiple self-interference patterns appear due to the polarization components of light may be obtained, and by extracting images of regions in which peaks appear due to interference between the polarization components of light in the original image, a plurality of elements representing the polarization components of light may be obtained. Polarization components of light may be generated by a compensator and/or a beam displacer. The critical dimension may be accurately determined using a plurality of elements which may represent parameters other than the intensity difference and phase difference of polarization components of light. Also, regardless of the interaction between critical dimensions which may affect each other in the process, the critical dimension to be measured may be accurately determined.

One or more of the elements disclosed above may include or be implemented in processing circuitry such as hardware including logic circuits; a hardware/software combination such as a processor executing software; or a combination thereof. For example, the processing circuitry may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

In example embodiments, a semiconductor measurement apparatus may be applied in one or more manufacturing processes of a semiconductor device. For example, a semiconductor structure, such as any one of the semiconductor devices 400, 400A, 400B, and/or 400C in FIGS. 5A to 5D, may be formed. Then, according to example embodiments discussed above, a semiconductor measurement apparatus may measure a critical dimension of the semiconductor structure, such as a height and/or width of the fin structures in the semiconductor devices 400, 400A, 400B, and/or 400C in FIGS. 5A to 5D (see H1, H2, W1, W2 in FIGS. 5A to 5D). Then, the measured critical dimension may be compared to a first threshold value and a second threshold value. The second threshold value may be greater than the first threshold value. The first threshold value and the second threshold value may correspond to a target range for the critical dimension, but are not limited thereto. If the measured critical dimension is greater than or equal to the first threshold value and less than or equal to the second threshold value, then at least one subsequent manufacturing process (e.g., forming a metallization pattern connected to the source/drain contacts 430) may be performed on the semiconductor structure (e.g., semiconductor devices 400, 400A, 400B, and/or 400C). Accordingly, by applying a semiconductor measurement apparatus in manufacturing a semiconductor device, one or more critical dimensions of the semiconductor device may be more accurately determined while manufacturing the semiconductor device, thereby a semiconductor measurement apparatus in example embodiments may be applied to limit and/or prevent manufacturing a semiconductor device without desired structural dimensions. As structural dimensions may affect electrical characteristics and yields of a semiconductor device, a semiconductor measurement apparatus in example embodiments may be applied to improve electrical characteristics and manufacturing yields of a semiconductor device.

While some example embodiments have been illustrated and described above, it will be configured as apparent to those skilled in the art that modifications and variations could be made without departing from the scope of inventive concepts as defined by the appended claims.

What is claimed is:

1. A semiconductor measurement apparatus, comprising:
an illumination unit including a light source and an illumination optical system, the illumination optical system in a path of light emitted from the light source;
a light receiving unit including a light-receiving optical system and an image sensor,
the light-receiving optical system in a path of light passing through the illumination optical system and reflected from a sample, and
the image sensor configured to output an original image by receiving light passing through the light-receiving optical system; and
a control unit configured to determine, by processing the original image, a selected critical dimension among critical dimensions of a structure included in a region of the sample to which light is incident;
wherein one of the illumination optical system and the light-receiving optical system includes a compensator, and an other one of the illumination optical system and the light-receiving optical system includes a plurality of beam displacers, and
wherein the control unit is configured to obtain the original image in which a peak appears due to interference while rotating the compensator, to select regions in which a peak appears in the original image and to obtain a plurality of sample images, to determine a plurality of elements included in a Mueller matrix using the plurality of sample images, and to identify the selected critical dimension based on the plurality of elements.

2. The semiconductor measurement apparatus of claim 1, wherein
the compensator includes a polarizer and a ¼ wave plate, and
the polarizer and ¼ wave plate are disposed in order along a path of light.

3. The semiconductor measurement apparatus of claim 1, wherein
the other one of the illumination optical system and the light-receiving optical system further includes a half wave plate and a polarizer,
the half wave plate is between a portion of the plurality of beam displacers, and
the polarizer is in a path of light passing through the plurality of beam displacers.

4. The semiconductor measurement apparatus of claim 1, wherein
the control unit is configured to
obtain a first original image, a second original image, a third original image, and a fourth original image by changing a rotation angle of the compensator by 45 degrees, and
obtain four regions in which peaks appear in each of a first frequency-conversion image, a second frequency-conversion image, a third frequency-conversion image, and a fourth frequency-conversion image generated by converting the first original image, the second original image, the third original image, and the fourth original image into frequency domains, respectively, and
wherein the plurality of sample images are obtained by selecting 16 regions obtained from the first frequency-conversion image, the second frequency-conversion image, the third frequency-conversion image, and the fourth frequency-conversion image.

5. The semiconductor measurement apparatus of claim 4, wherein
the four regions in which the peak appears in the first frequency-conversion image are at same coordinates as those of the four regions in which the peak appears in the second frequency-conversion image, the four regions in which the peak appears in the third frequency-conversion image, and the four regions in which the peak appears in the fourth frequency-conversion image.

6. The semiconductor measurement apparatus of claim 1, wherein the control unit is configured to extract, by converting the original image into a frequency domain, a plurality of peak images corresponding to regions in which a peak appears due to interference between polarization components passing through the illumination optical system and the light-receiving optical system, and
wherein the control unit is configured to obtain the plurality of sample images by frequency-inverse transforming each of the plurality of peak images.

7. The semiconductor measurement apparatus of claim 6, wherein
each of the plurality of sample images corresponds to one region of the regions in which the peak appears, and
in each of the plurality of sample images, a peak appearing in the one region is displayed in a center.

8. The semiconductor measurement apparatus of claim 1, wherein the control unit is configured to calculate a measurement parameter for determining the selected critical dimension based on the plurality of elements, and
wherein the control unit is configured to determine the selected critical dimension by comparing the measurement parameter with a reference parameter included in library data.

9. The semiconductor measurement apparatus of claim 8, wherein
the measurement parameter includes an intensity difference between polarization components of light incident to the image sensor, a phase difference between the polarization components, and a degree of polarization (DOP).

10. The semiconductor measurement apparatus of claim 1,
wherein each of the plurality of elements is data in an image format, and
wherein the control unit is configured to determine the selected critical dimension by comparing the plurality of elements with reference image data stored in library data.

11. The semiconductor measurement apparatus of claim 1, further comprising:
an objective lens in a path of light incident to the sample and on a path of light reflected from the sample, wherein
the objective lens has a numerical aperture of 0.8 or more and less than 1.0.

12. The semiconductor measurement apparatus of claim 11, wherein an incident angle of light reflected from the sample and incident to the objective lens is greater than or equal to 0 degrees and less than or equal to 85 degrees.

13. The semiconductor measurement apparatus of claim 1, wherein
the control unit is configured to specify an azimuth angle, an incident angle, and a wavelength of light reflected from the sample and incident to the image sensor, and the control unit is configured to determine the selected critical dimension by extracting element images corresponding to the azimuth angle, the incident angle, and the wavelength from each of the plurality of elements.

14. The semiconductor measurement apparatus of claim 1, wherein the control unit is configured to select at least one element having a highest sensitivity for the selected critical dimension from among the plurality of elements, and to determine the selected critical dimension based on the at least one element.

* * * * *